United States Patent
Williams

(10) Patent No.: US 10,359,529 B2
(45) Date of Patent: Jul. 23, 2019

(54) SINGULARITY SPECTRUM ANALYSIS OF MICROSEISMIC DATA

(71) Applicant: Schlumberger Technology Corporation, Sugar Land, TX (US)

(72) Inventor: Michael John Williams, Ely (GB)

(73) Assignee: Schlumberger Technology Corporation, Sugar Land, TX (US)

(*) Notice: Subject to any disclaimer, the term of this patent is extended or adjusted under 35 U.S.C. 154(b) by 927 days.

(21) Appl. No.: 14/323,468

(22) Filed: Jul. 3, 2014

(65) Prior Publication Data
US 2015/0212224 A1 Jul. 30, 2015

Related U.S. Application Data

(60) Provisional application No. 61/933,404, filed on Jan. 30, 2014.

(51) Int. Cl.
| | |
|---|---|
| G01V 1/28 | (2006.01) |
| G01V 1/40 | (2006.01) |
| G01V 1/30 | (2006.01) |
| G01V 1/34 | (2006.01) |

(52) U.S. Cl.
CPC .............. *G01V 1/40* (2013.01); *G01V 1/288* (2013.01); *G01V 1/301* (2013.01); *G01V 1/34* (2013.01); *G01V 2210/1234* (2013.01)

(58) Field of Classification Search
USPC ........................................................ 702/14
See application file for complete search history.

(56) References Cited

U.S. PATENT DOCUMENTS

| | | | | |
|---|---|---|---|---|
| 2007/0242564 A1* | 10/2007 | Devi | .............. | G01V 1/30 367/73 |
| 2012/0160481 A1 | 6/2012 | Williams | | |
| 2013/0044567 A1* | 2/2013 | Kratz | .............. | G01V 1/288 367/31 |
| 2013/0054147 A1* | 2/2013 | Diller | .............. | G01V 1/288 702/14 |

(Continued)

FOREIGN PATENT DOCUMENTS

WO  2014110542 A1  7/2014

OTHER PUBLICATIONS

Grob, Melanie; Van Der Baan, Mirko; Inferring in-situ Stress Changers by Statistical Analysis of Microseismic Event Characteristics; Nov. 2011; The Leading Edge; Canada, Arctic Technology; 1296-1301.*

(Continued)

Primary Examiner — Gregory J Toatley, Jr.
Assistant Examiner — Terence E Stifter, Jr.
(74) Attorney, Agent, or Firm — Colin L. Wier; Gary Gex; Mitch Blakely

(57) ABSTRACT

A method can include receiving locations of microseismic events associated with a fracturing operation performed in a geologic environment; determining an individual correlation exponent for one of the microseismic events based at least in part on distances where each of the distances is between the location of the one microseismic event and a location of another one of the microseismic events; and, based at least in part on the individual correlation exponent, associating the one of the microseismic events with a fracture generated or activated by the fracturing operation.

20 Claims, 14 Drawing Sheets

(56) References Cited

U.S. PATENT DOCUMENTS

| 2013/0144532 A1 | 6/2013 | Williams et al. | |
| 2014/0100833 A1* | 4/2014 | Williams | G01V 1/288 |
| | | | 703/10 |
| 2014/0372094 A1* | 12/2014 | Holland | G01V 11/00 |
| | | | 703/10 |
| 2015/0057985 A1* | 2/2015 | Ma | E21B 43/26 |
| | | | 703/2 |

OTHER PUBLICATIONS

Examination Report issued in related GB application GB1500282.7 dated Jun. 18, 2015, 7 pages.
Fisher, et al., "Integrating Fracture Mapping Technologies to Optimize Stimulations in the Barnett Shale", SPE 77441 SPE Annual Technical Conference and Exhibition, 2002, pp. 1-7.
Grassberger, et al., "Measuring the strangeness of strange attractors", Physica D: Nonlinear Phenomena, vol. 9, Issues 1-2, Oct. 1983, pp. 189-208.
Grob, et al., "Statistical analysis of microseismic event locations and magnitudes and their geomechanical implications", 2011 CSPG CSEG CWLS Convention, 2011, 4 pages.
Grob, et al., "Statistics of Microseismic Events: Implications for Geomechanics", GeoConvention, Calgary, AB, Canada, May 14-18, 2012, 4 pages.
Verdon, et al., "Correlation Between Spatial and Magnitude Distributions of Microearthquakes during Hydraulic Fracture Stimulation", 75th EAGE Conference & Exhibition incorporating SPE EUROSPEC 2013, 2013.

* cited by examiner

Model 410

Method 450

SINGULARITY SPECTRUM ANALYSIS OF MICROSEISMIC DATA

RELATED APPLICATION

This patent application claims priority to and the benefit of a U.S. Provisional Application having Ser. No. 61/933404, filed 30 Jan. 2014, which is incorporated by reference herein.

BACKGROUND

Seismic analysis may process seismic data (e.g., location and time or depth) in an effort to identify subsurface structures. Structures may be, for example, faulted stratigraphic formations indicative of hydrocarbon traps or flow channels, hydraulically induced fractures that can increase flow from a reservoir, etc. In the field of resource extraction, enhancements to seismic analysis can allow for construction of a more accurate model of a subterranean environment, which, in turn, may facilitate development, resource extraction, etc. Various techniques described herein pertain to processing of seismic data, for example, for analysis of such data to characterize one or more regions in a geologic environment and, for example, to perform one or more operations (e.g., field operations, etc.).

SUMMARY

A method can include receiving locations of microseismic events associated with a fracturing operation performed in a geologic environment; determining an individual correlation exponent for one of the microseismic events based at least in part on distances where each of the distances is between the location of the one microseismic event and a location of another one of the microseismic events; and, based at least in part on the individual correlation exponent, associating the one of the microseismic events with a fracture generated or activated by the fracturing operation.

A system can include a processor; memory operatively coupled to the processor; and one or more modules that include processor-executable instructions stored in the memory to instruct the system to receive locations of microseismic events associated with a fracturing operation performed in a geologic environment; and determine an individual correlation exponent for one of the microseismic events based at least in part on distances where each of the distances is between the location of the one microseismic event and a location of another one of the microseismic events.

One or more computer-readable storage media can include computer-executable instructions to instruct a computer to: determine a plurality of b-value adjusted individual D-values for corresponding individual microseismic events associated with one or more fracturing operations performed in a geologic environment. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
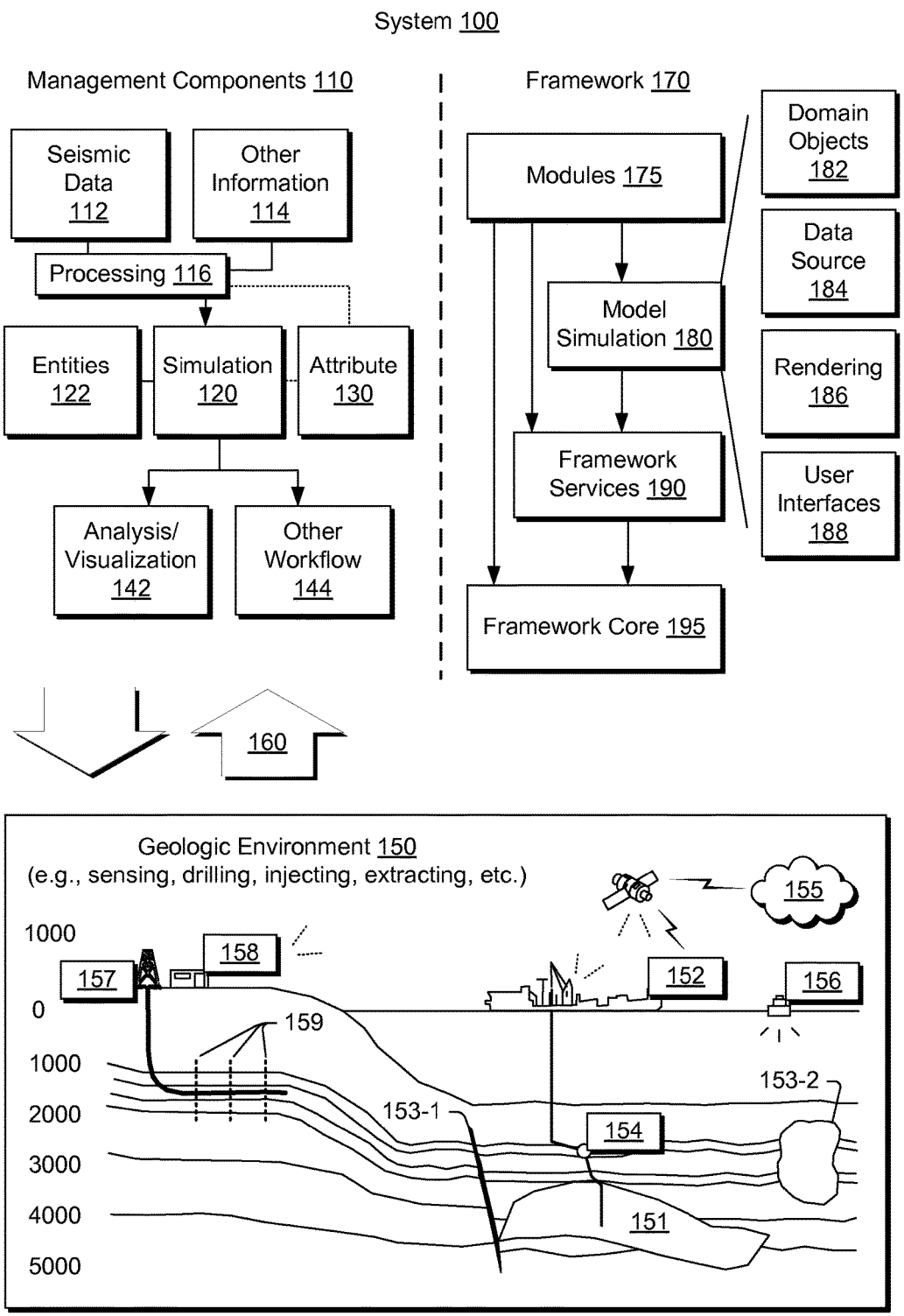
FIG. 1 illustrates an example system that includes various components for modeling a geologic environment and various equipment associated with the geologic environment.

FIG. 1 shows an example of a system 100 that includes various management components 110 to manage various aspects of a geologic environment 150 (e.g., an environment that includes a sedimentary basin, a reservoir 151, one or more faults 153-1, one or more geobodies 153-2, one or more fractures 159, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT®.NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include the reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with the one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
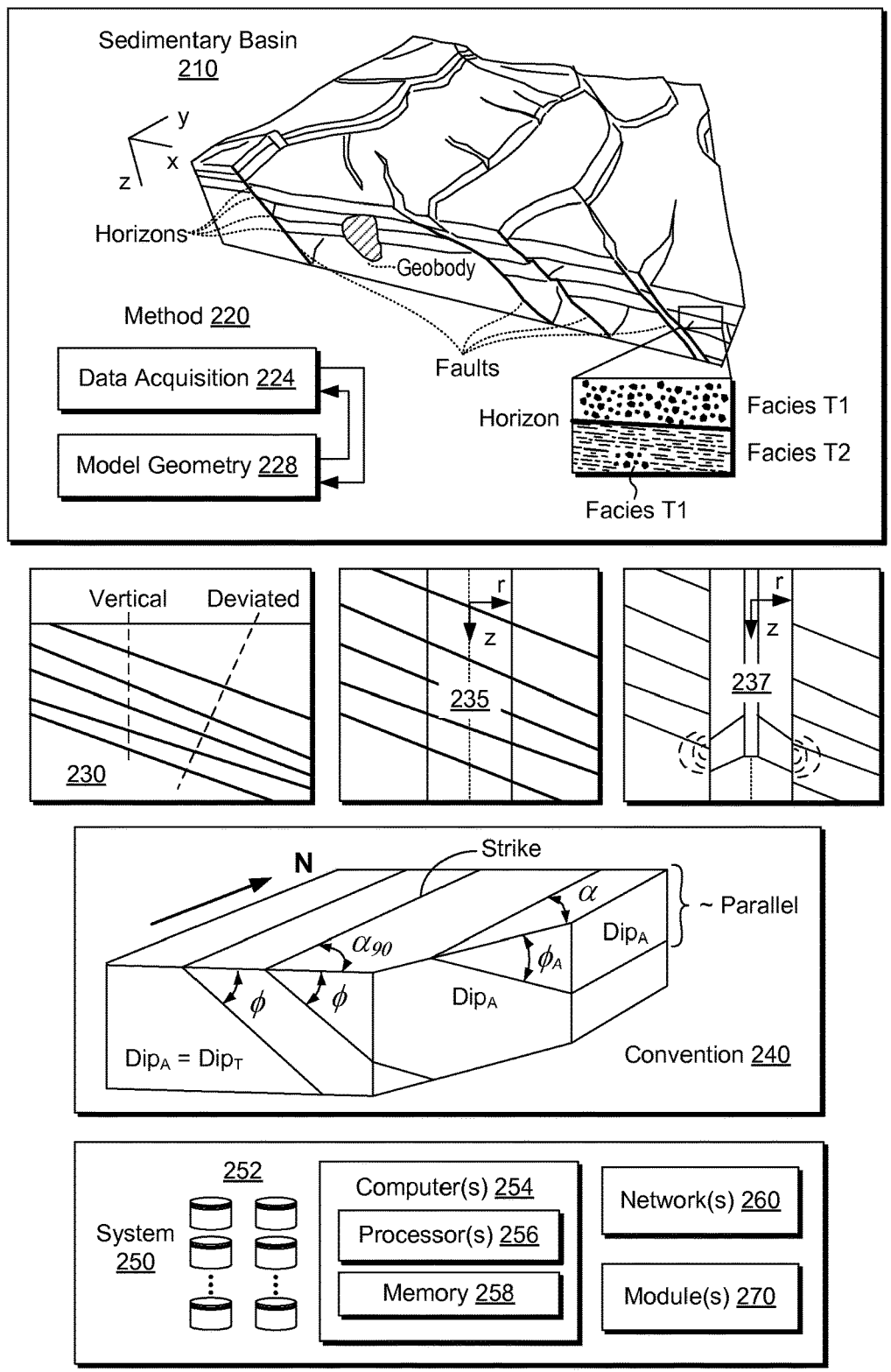
FIG. 2 illustrates an example of a sedimentary basin, an example of a method, an example of a formation, an example of a borehole, an example of a borehole tool, an example of a convention and an example of a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.). As an example, data may be provided via a storage medium, via wire, via wireless circuitry, etc. For example, a computing system may receive and/or access data via a storage medium, via wire, via wireless circuitry, etc.

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230 (e.g., consider a borehole that extends substantially along a direction of Earth's gravity). As an example, a tool 237 may be positioned in a borehole, for example, to acquire information. As mentioned, a borehole tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material. Data may be acquired, for example, via technologies such as intra-borehole, inter-borehole, surface-to-borehole, borehole-to-surface, etc.

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG® framework (Schlumberger Limited, Houston, Tex.).

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles φ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle α); however, it is possible that the apparent dip is equal to the true dip (see, e.g., φ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with φ as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more modules 270. As to the one or more computers 254, each computer may include one or more processors (e.g., or processing cores) 256 and memory 258 for storing instructions (e.g., modules), for example, executable by at least one of the one or more processors. As an example, a computer may include one or more network interfaces (e.g., wired and/or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more modules 270 may include instructions (e.g., stored in memory) executable by one or more processors to instruct the system 250 to perform various actions. As an example, the system 250 may be configured such that the one or more modules 270 provide for establishing the framework 170 of FIG. 1 or a portion thereof. As an example, one or more methods, techniques, etc. may be performed using one or more modules, which may be, for example, one or more of the one or more modules 270 of FIG. 2.

As mentioned, seismic data may be acquired and analyzed to understand better subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less that 1 Hz and/or optionally more than 100 Hz). Seismic data may be processed and interpreted, for example, to understand better composition, fluid content, extent and geometry of subsurface rocks.

Figure 3:
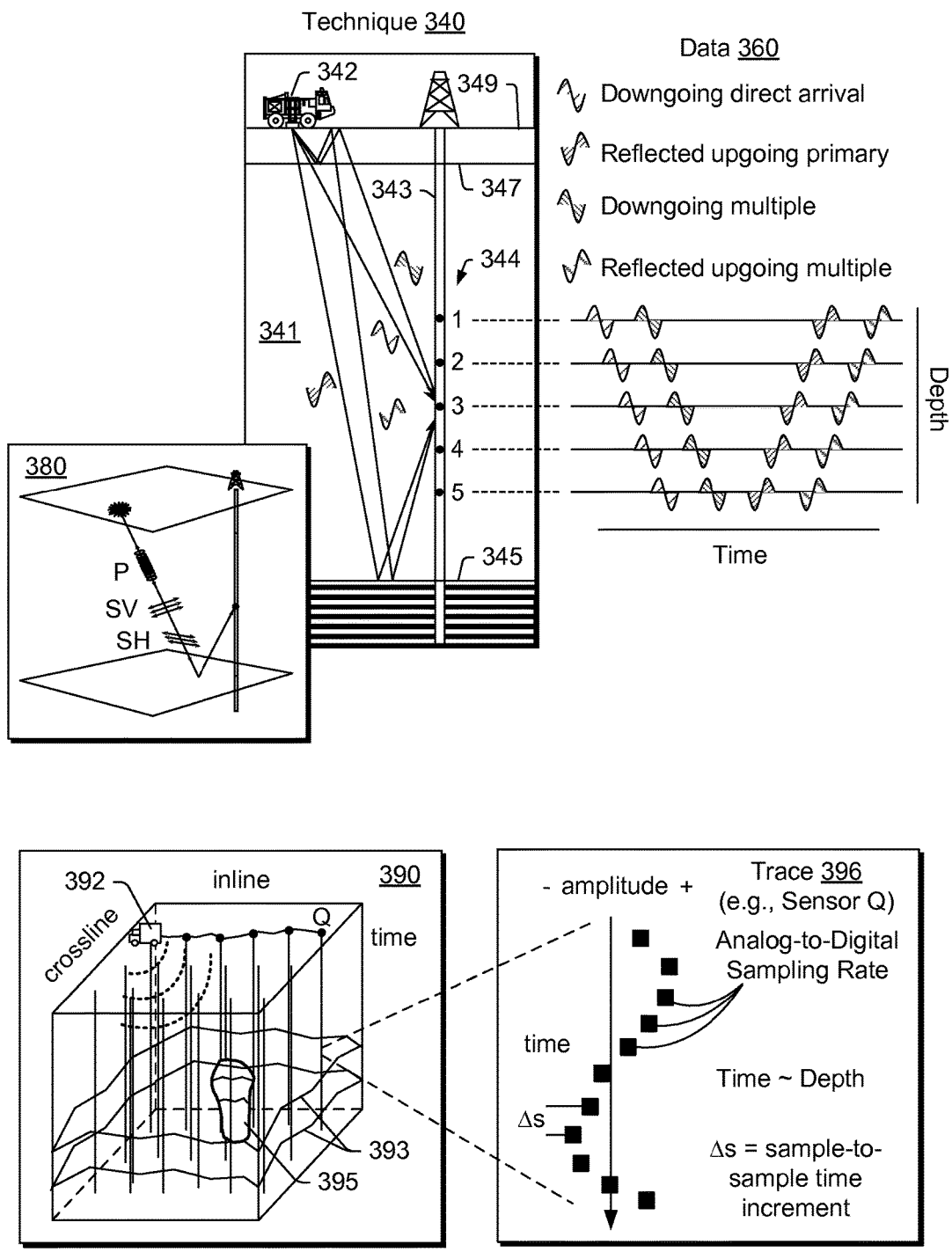
FIG. 3 illustrates an example of a technique that may acquire data.

FIG. 3 shows an example of an acquisition technique 340 to acquire seismic data (see, e.g., data 360). As an example, a system may process data acquired by the technique 340, for example, to allow for direct or indirect management of sensing, drilling, injecting, extracting, etc., with respect to a geologic environment. In turn, further information about the geologic environment may become available as feedback (e.g., optionally as input to the system). As an example, an operation may pertain to a reservoir that exists in a geologic environment such as, for example, an oil, gas or oil and gas reservoir. As an example, a technique may provide information (e.g., as an output) that may specifies one or more location coordinates of a feature in a geologic environment, one or more characteristics of a feature in a geologic environment, etc.

In FIG. 3, the technique 340 may be implemented with respect to a geologic environment 341. As shown, an energy source (e.g., a transmitter) 342 may emit energy where the energy travels as waves that interact with the geologic environment 341. As an example, the geologic environment 341 may include a bore 343 where one or more sensors (e.g., receivers) 344 may be positioned in the bore 343. As an example, energy emitted by the energy source 342 may interact with a layer (e.g., a structure, an interface, etc.) 345 in the geologic environment 341 such that a portion of the energy is reflected, which may then be sensed by one or more of the sensors 344. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 341 is shown as including a layer 347 that resides below a surface layer 349. Given such an environment and arrangement of the source 342 and the one or more sensors 344, energy may be sensed as being associated with particular types of waves.

As an example, a "multiple" may refer to multiply reflected seismic energy or, for example, an event in seismic data that has incurred more than one reflection in its travel path. As an example, depending on a time delay from a primary event with which a multiple may be associated, a multiple may be characterized as a short-path or a peg-leg, for example, which may imply that a multiple may interfere with a primary reflection, or long-path, for example, where a multiple may appear as a separate event. As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 3, the acquired data 360 can include data associated with downgoing direct arrival waves, reflected upgoing primary waves, downgoing multiple reflected waves and reflected upgoing multiple reflected waves. The acquired data 360 is also shown along a time axis and a depth axis. As indicated, in a manner dependent at least in part on characteristics of media in the geologic environment 341, waves travel at velocities over distances such that relationships may exist between time and space. Thus, time information, as associated with sensed energy, may allow for understanding spatial relations of layers, interfaces, structures, etc. in a geologic environment.

FIG. 3 also shows a diagram 380 that illustrates various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that may characterize anisotropy of media (e.g., seismic anisotropy), consider the Thomsen parameters $\epsilon$, $\delta$ and $\gamma$. The Thomsen parameter $\delta$ describes depth mismatch between logs (e.g., actual depth) and seismic depth. As to the Thomsen parameter $\epsilon$, it describes a difference between vertical and horizontal compressional waves (e.g., P or P-wave or quasi compressional wave qP or qP-wave). As to the Thomsen parameter $\gamma$, it describes a difference between horizontally polarized and vertically polarized shear waves (e.g., horizontal shear wave SH or SH-wave and vertical shear wave SV or SV-wave or quasi vertical shear wave qSV or qSV-wave). Thus, the Thomsen parameters $\epsilon$ and $\gamma$ may be estimated from wave data while estimation of the Thomsen parameter $\delta$ may involve access to additional information.

In the example of FIG. 3, a diagram 390 shows acquisition equipment 392 emitting energy from a source (e.g., a transmitter) and receiving reflected energy via one or more sensors (e.g., receivers) strung along an inline direction. As the region includes layers 393 and, for example, the geobody 395, energy emitted by a transmitter of the acquisition equipment 392 can reflect off the layers 393 and the geobody 395. Evidence of such reflections may be found in the acquired traces. As to the portion of a trace 396, energy received may be discretized by an analog-to-digital converter that operates at a sampling rate. For example, the acquisition equipment 392 may convert energy signals sensed by sensor Q to digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

Resource recovery from a geologic environment may benefit from application of one or more enhanced recovery techniques. For example, a geologic environment may be artificially fractured to increase flow of fluid from a reservoir to a well. As an example, consider hydraulic fracturing where fluid pressure is applied to a subterranean environment to generate fractures that can act as flow channels. Hydraulic fracturing may be planned in advance, for example, to develop a region, which may be referred to as a drainage area. Hydraulic fracturing may be analyzed during or post-fracturing. As an example, hydraulic fracturing may occur in stages where a later stage may be planned at least in part based on information associated with one or more earlier stages.

Figure 4:
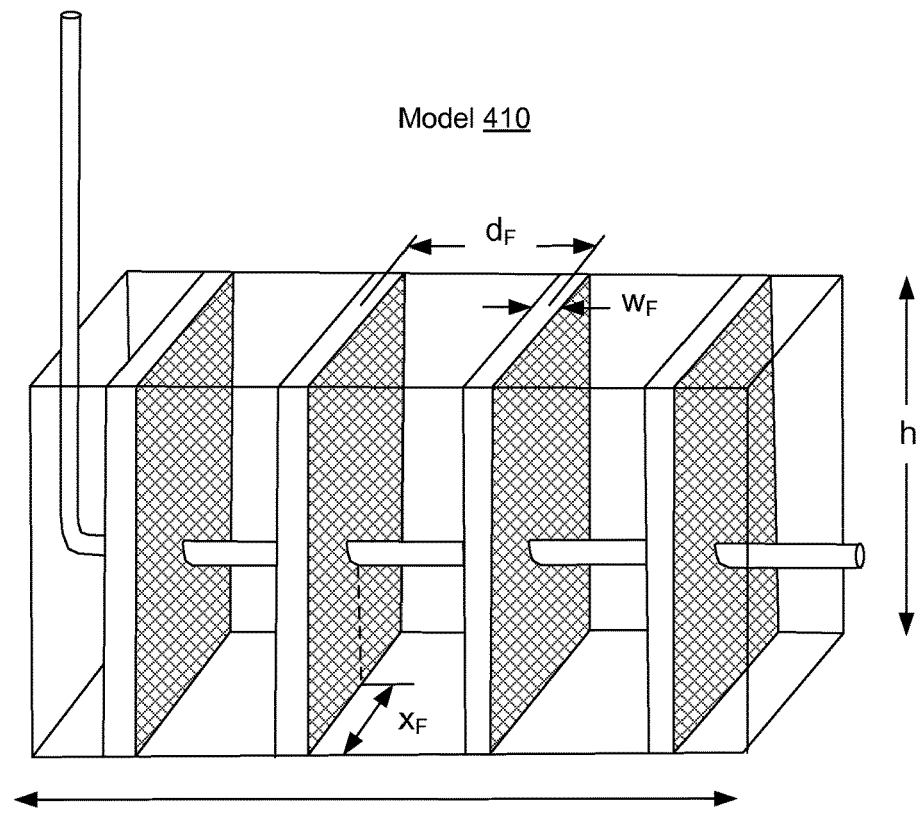
FIG. 4 illustrates an example of a model that includes fractures and an example of a method.
Figure 4:
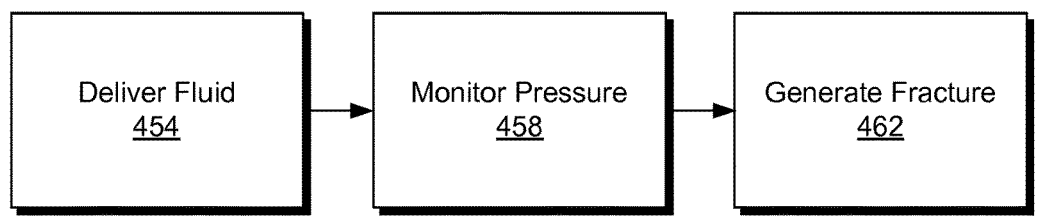

FIG. 4 shows an example of a model 410 that includes a horizontal well intersected by multiple transverse vertical hydraulic fractures. Equations may be associated with the model 410 such as, for example, equations that depend on dimensions and properties of the vertical fractures. As an example, consider a trilinear model that includes equations for analysis of low-permeability (e.g., micro- and nano-Darcy range) fractured shale reservoirs according to three linear flow regions. Such a model may help to characterize a drainage area completed with one or more horizontal wells that intersect multiple transverse vertical fractures. Such a model may assist with planning and other aspects of field development, operations, etc.

As an example, a model can include constructs that model, for example, a matrix, a well, natural fractures, hydraulic fractures, activated fractures and a stimulated inter-hydraulic fracture region. In the example of FIG. 4, the model 410 may encompass a drainage area, for example, defined as covering a surface area and as having a depth or depths. Given parameter values for the various constructs (e.g., locations, characteristics, etc.), the model 410 may be formulated with respect to a grid to form a numerical model suitable for providing solutions via a numerical solver.

As an example, a trilinear model can include a first region of idealized linear flow in a reservoir region within a length of fractures. Within the first region, linear flow may be assumed to exist in which fluid flow is normal to a plane of one or more vertical fractures. In such an example, reservoir volume may be defined by lengths of vertical fractures, formation thickness, number of vertical fractures, and spacing between adjacent fractures (e.g., consider a reservoir volume that may be referred to as a stimulated reservoir volume (SRV)). As an example, a second region in a trilinear model may be for idealized linear flow within a fracture and a third region may be for idealized linear flow in one or more reservoir regions beyond a length of vertical fracture(s). In low permeability reservoirs (e.g., such as fractured shale gas and oil reservoirs), contribution to production of a well from a reservoir region that lies beyond the SRV may be negligible in practice.

FIG. 4 also shows an example of a method 450 that includes a delivery block 454 for delivering fluid to a subterranean environment, a monitor block 458 for monitoring fluid pressure and a generation block 462 for generating fractures via fluid pressure. As an example, the generation block 462 may include activating one or more fractures. As an example, the generation block 462 may include generating and activating fractures. As an example, activation may occur with respect to a pre-existing feature such as a fault or a fracture. As an example, a pre-existing fracture network may be at least in part activated via a method that includes applying fluid pressure in a subterranean environment.

The method 450 may be referred to as a treatment method or a "treatment". Such a method may include pumping an engineered fluid (e.g., a treatment fluid) at high pressure and rate into a reservoir via one or more bores, for example, to one or more intervals to be treated, which may cause a fracture or fractures to open (e.g., new, pre-existing, etc.). As an example, a fracture may be defined as including "wings" that extend outwardly from a bore. Such wings may extend away from a bore in opposing directions, for example, according in part to natural stresses within a formation. As an example, proppant, such as grains of sand of a particular size, may be mixed with a treatment fluid to keep a fracture (or fractures) open when a treatment is complete. Hydraulic fracturing may create high-conductivity communication with an area of a formation and, for example, may bypass damage that may exist in a near-wellbore area. As an example, stimulation treatment may occur in stages. For example, after completing a first stage, data may be acquired and analyzed for planning and/or performance of a subsequent stage.

Size and orientation of a fracture, and the magnitude of the pressure needed to create it, may be dictated at least in part by a formation's in situ stress field. As an example, a stress field may be defined by three principal compressive stresses, which are oriented perpendicular to each other. The magnitudes and orientations of these three principal stresses may be determined by the tectonic regime in the region and by depth, pore pressure and rock properties, which determine how stress is transmitted and distributed among formations.

In situ stresses can control orientation and propagation direction of hydraulic fractures, which tend to be tensile fractures that open in the direction of least resistance. As an example, if the maximum principal compressive stress is an overburden stress, then the fractures tend to be vertical, propagating parallel to the maximum horizontal stress when the fracturing pressure exceeds the minimum horizontal stress.

As the three principal stresses tend to increase with depth, the rate of increase with depth can define a vertical gradient. The principal vertical stress, referred to at times as overburden stress, is caused by the weight of rock overlying a measurement point. Its vertical gradient is known as the litho-static gradient. The minimum and maximum horizontal stresses are the other two principal stresses. Their vertical gradients, which may vary widely by basin and lithology, tend to be controlled by local and regional stresses, mainly through tectonics.

The weight of fluid above a measurement point in normally pressured basins creates in situ pore pressure. The vertical gradient of pore pressure can be referred to as the hydrostatic gradient. However, pore pressures within a basin may be less than or greater than normal pressures and can be designated as underpressured or overpressured, respectively.

Where fluid pressure is monitored (see, e.g., the monitor block 458 of the method 450), a sudden drop in pressure can indicate fracture initiation of a stimulation treatment, as fluid flows into the fractured formation. As an example, to break rock in a target interval, fracture initiation pressure exceeds a sum of the minimum principal stress plus the tensile strength of the rock. To determine fracture closure pressure, a process may allow pressure to subside until it indicates that a fracture has closed. A fracture reopening pressure may be determined by pressurizing a zone until a leveling of pressure indicates the fracture has reopened. The closure and reopening pressures tend to be controlled by the minimum principal compressive stress (e.g., where induced downhole pressures exceed minimum principal stress to extend fracture length).

After performing fracture initiation, a zone may be pressurized for furthering stimulation treatment. As an example, a zone may be pressurized to a fracture propagation pressure, which is greater than a fracture closure pressure. The difference may be referred to as the net pressure, which represents a sum of frictional pressure drop and fracture-tip resistance to propagation (e.g., further propagation).

As an example, a method may include seismic monitoring during a treatment operation (e.g., to monitor fracture initiation, growth, etc.). For example, as fracturing fluid forces rock to crack and fractures to grow, small fragments of rock break, causing tiny seismic emissions, called microseisms. Equipment may be positioned in a field, in a bore, etc. to sense such emissions and to process acquired data, for example, to locate microseisms in the subsurface (e.g., to locate hypocenters). Information as to direction of fracture growth may allow for actions that can "steer" a fracture into a desired zone(s) or, for example, to halt a treatment before a fracture grows out of an intended zone.

Figure 5:
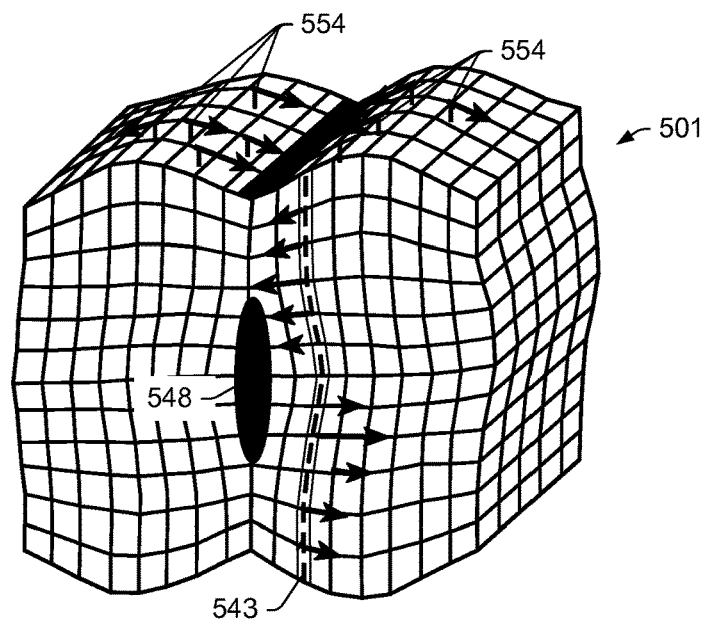
FIG. 5 illustrates an example of a fracture in a geologic environment and an example of a method.
Figure 5:
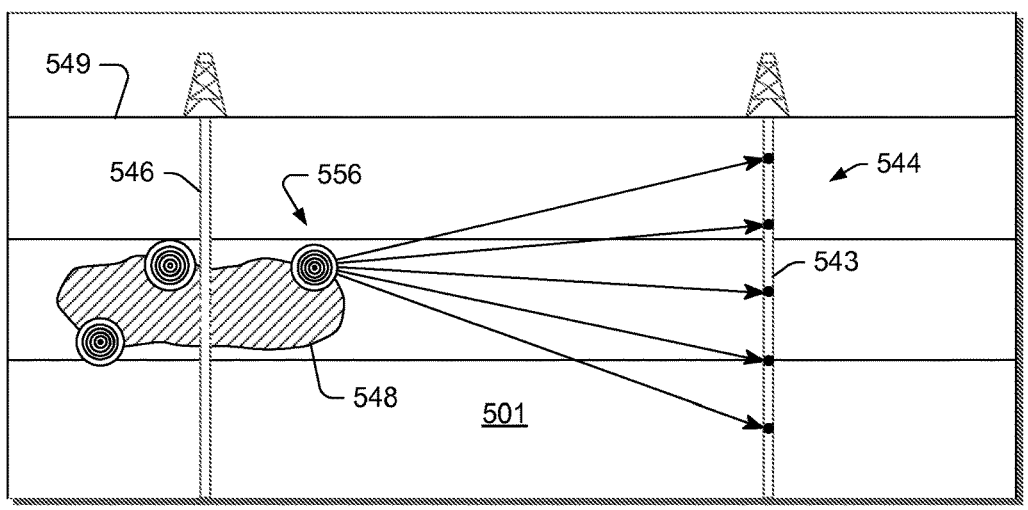
Figure 5:
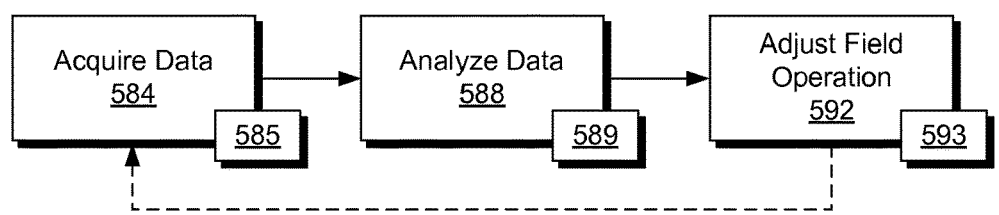

FIG. 5 shows an example of a geologic environment 501 in an approximate perspective view and in an approximate side view where the geologic environment 501 includes a monitoring bore 543 with a sensor array 544, a treatment bore 546, a fracture 548, a surface 549 and surface sensors 554 (e.g., seismic sensors, tiltmeters, etc.). As an example, during growth of the fracture 548, energy may be emitted as a microseismic event 556. As shown, at least a portion of the energy associated with the microseismic event 556 may be detected at one or more sensors such as, for example, one or more sensors of the sensor array 544 and/or one or more of the surface sensors 554.

Where energy is sensed via the sensor array 544, such an approach may be referred to as a crosswell survey or crosswell technique. As illustrated in FIG. 5, the bore 546 may be an injection bore, for example, for injecting fluid, particles, chemicals, etc. germane to fracturing (e.g., a fracturing operation) and the bore 543 may be referred to as a monitoring bore (e.g., or a receiver or sensor bore).

As an example, tiltmeter information as to fracture-induced tilt or deformation may be acquired and analyzed and/or seismographic information as to microseismic energy may be acquired and analyzed. As an example, a map of deformation at a surface may allow for estimation of one or more of azimuth, dip, depth and width of a fracture. As an example, an acquisition system may be selected based in part on fracture depth. For example, microseismology may be implemented for monitoring where a fracture is expected to cause relatively little detectable surface tilt or deformation.

FIG. 5 also shows an example of a method 580 that includes an acquisition block 584 for acquiring data, an analysis block 588 for analyzing at least a portion of the acquired data and an adjustment block 592 for adjusting one or more field operations, for example, based at least in part on the analyzing. Such a method may include acquiring microseismic data, analyzing at least a portion of the microseismic data and optionally adjusting one or more field operations based at least in part on the analyzing. As an example, a method may include rendering to a display visual representations of information associated with one or more fractures, for example, to determine size, orientation, etc. of one or more fractures.

The method 580 may be associated with various computer-readable media (CRM) blocks or modules 585, 589 and 593. Such blocks or modules may include instructions suitable for execution by one or more processors (or processor cores) to instruct a computing device or system to perform one or more actions. As an example, a single medium may be configured with instructions to allow for, at least in part, performance of various actions of the method 580. As an example, a computer-readable medium (CRM) may be a computer-readable storage medium (e.g., a non-transitory medium) that is not a carrier wave.

Figure 6:
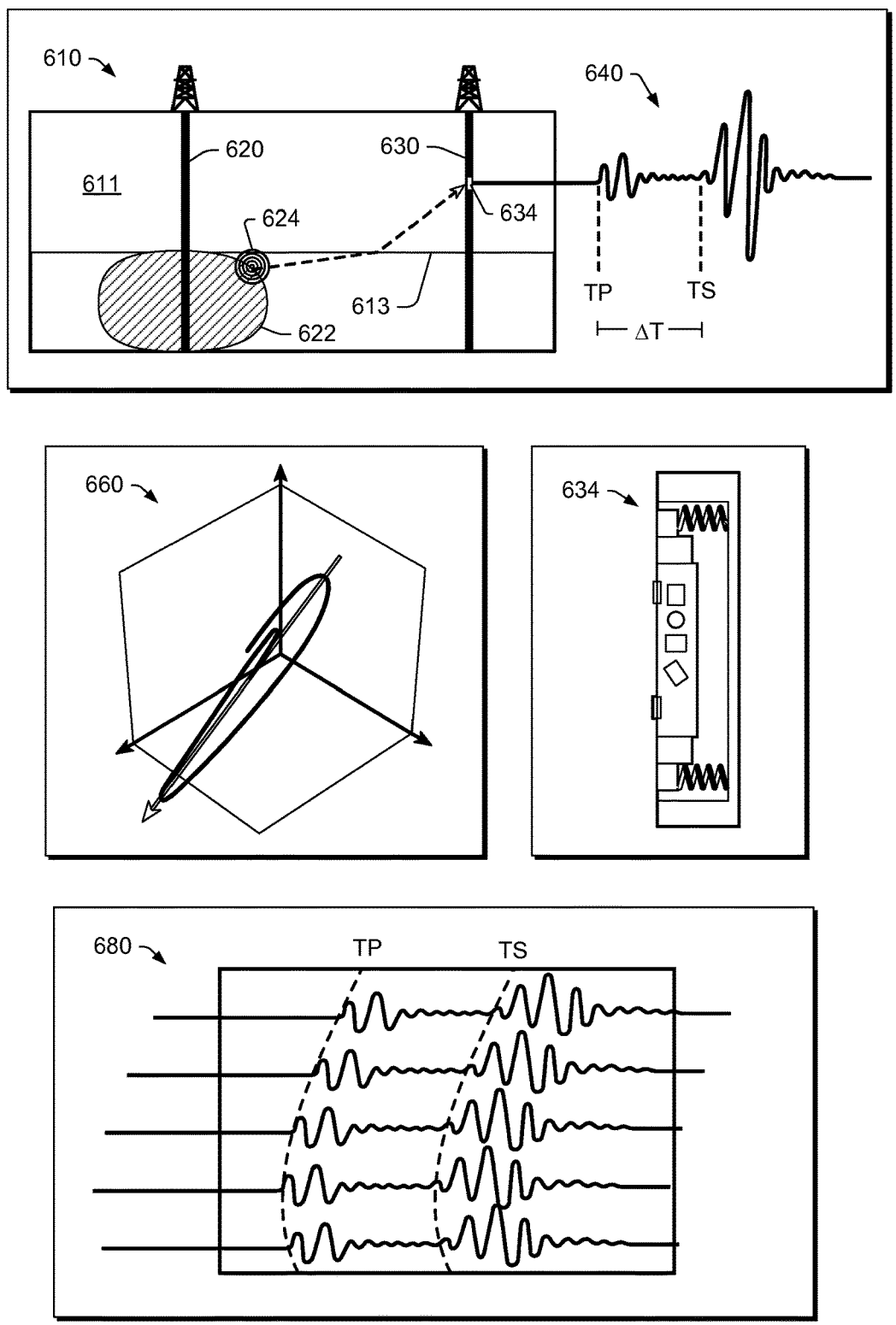
FIG. 6 illustrates examples of analysis techniques associated with microseismology.

FIG. 6 shows an example of a microseismic survey 610, which may be considered to be a method that implements equipment for sensing elastic wave emissions of microseismic events (e.g., elastic wave energy emissions caused directly or indirectly by a treatment). As shown, the survey 610 is performed with respect to a geologic environment 611 that may include a reflector 613. The survey 610 includes an injection bore 620 and a monitoring bore 630. Fluid injected via the injection bore 620 generates a fracture 622 that is associated with microseismic events such as the event 624. As shown in the example of FIG. 6, energy of a microseismic event may travel through a portion of the geologic environment 611, optionally interacting with one or more reflectors 613, and pass to the monitoring bore 630 where at least a portion of the energy may be sensed via a sensing unit 634, which may include a shaker, three-component geophone accelerometers isolated from a sensing unit body (e.g., via springs, etc.), coupling contacts, etc. In the example of FIG. 6, the sensed energy includes compressional wave energy (P-wave) and shear wave energy (S-wave).

As an example, sensed energy may be analyzed, for example, to determine one or more of distance and azimuth from a sensor to a source of an elastic wave emission and depth of a source of an elastic wave emission. In a fracturing operation, a source of an elastic wave emission may be registered as an event, which includes a time, a location and one or more acquired signals (e.g., traces).

As an example, distance (d) to an event may be derived by measuring a time difference ($\Delta T$) between arrival times for a P-wave (TP) and an S-wave (TS). The value of d may depend on use of a velocity model that characterizes velocity of elastic wave energy (e.g., elastic waves) with respect to depth. A velocity model may describe P-wave velocity and S-wave velocity with respect to depth (e.g., variation in material, pressures, etc. of a geologic environment).

As an example, azimuth to a microseismic event may be determined by analyzing particle motion of P-waves, for example, using hodograms. FIG. 6 shows an example of a hodogram 660 as a plot of sensed energy along at least two geophone axes as a function of time. A hodogram may be a graph or curve that displays time versus distance of motion. For example, a hodogram may be a crossplot of two components of particle motion over a time window. Hodograms may be part of a borehole seismologic survey where they may be used to determine arrival directions of waves and to detect shear-wave splitting.

As to determination of depth of a microseismic event, as illustrated in a plot 680, P-wave and S-wave arrival delays between sensors, or moveout, at the monitoring bore 630 may be analyzed.

Microseismicity recorded during large multistage fracture treatments may provide disperse "clouds" of events (e.g., located at individual event hypocenters). As an example, a method can include analyzing clouds of events to extract planar-type features. For example, a method may employ a singularity spectrum analysis that may determine a dimensionality of individual events. As an example, a method may include implementing one or more bias-correction techniques, for example, to diminish bias due to a distribution bias of microseismic event magnitudes and/or to diminish bias due to a detection-limit bias of a microseismic survey. As an example, a bias-correction technique may be implemented as part of a correlation integral calculation where counts are multiplied by an adjustment factor, for example, to arrive at an adjusted count. In such an example, a count may be a two-event count or an event pair count where information associated with two events are analyzed. As an example, given a population of events, individual events may be analyzed with respect to other individual events. In such an example, an analyzed event may be assigned a count, for example, based at least in part on a distance, time or time-distance measure to another event. The analyzed event may be assigned a plurality of counts, for example, one count for each event pair considered. A total count may be less than a number of event pairs considered, for example, due to one or more count adjustments (e.g., that may diminish a count from a value of unity to less than unity).

As an example, a count adjustment may be based at least in part on an exponential distribution characterized by a b-value associated with a Gutenberg-Richter relationship for number and magnitude of events. Such an adjustment may be applied to a microseismic data-set, for example, as part of a workflow that aims to extract one or more planar-type features from a cloud of events.

Figure 7:
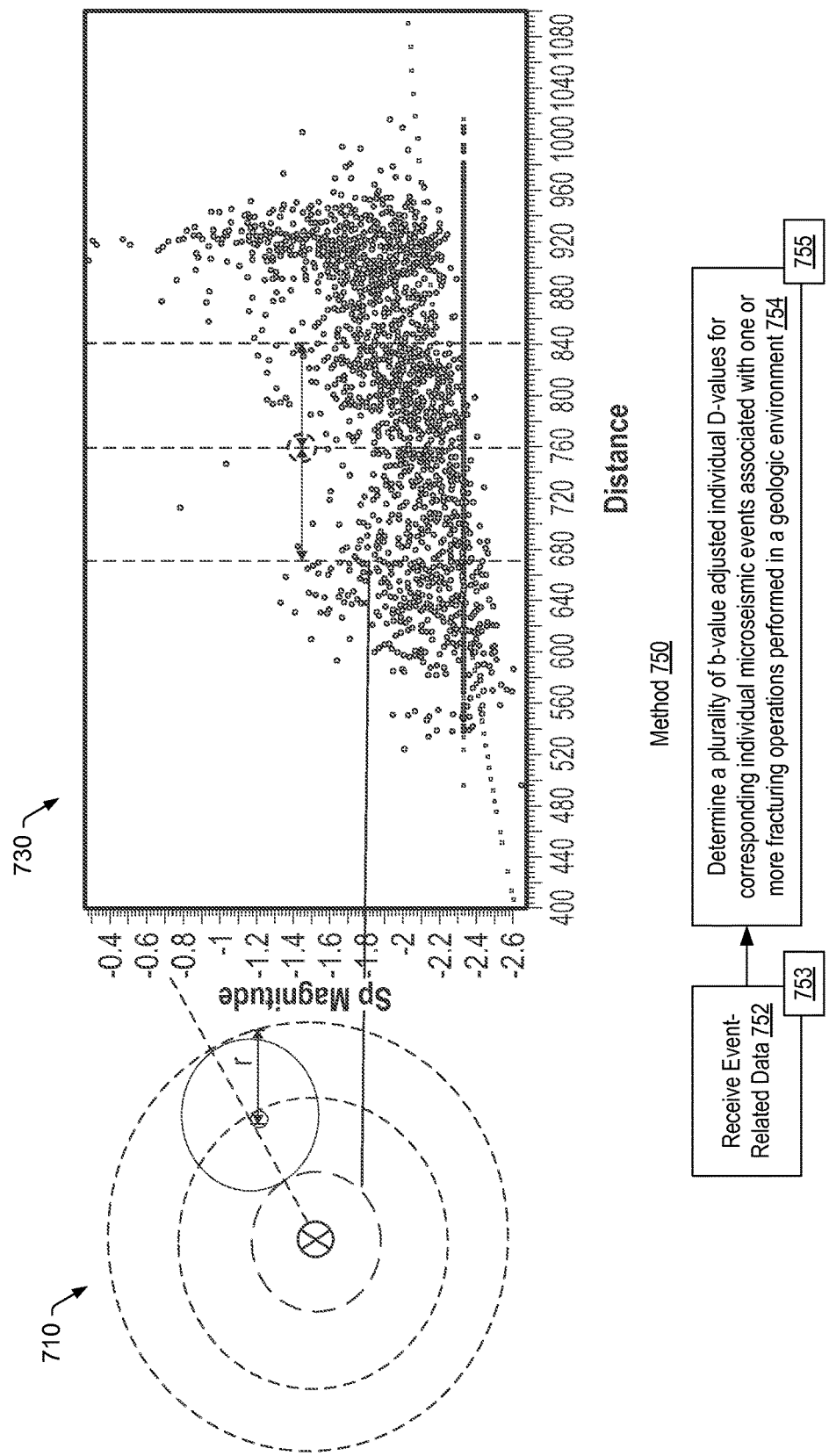
FIG. 7 illustrates an example data and associated bias and an example of a method.

FIG. 7 shows a microseismic survey 710, an associated plot 730 of events and an example of a method 750. The microseismic survey 710 includes a monitoring bore that is shown with respect to an event and a series of rings that represent diameters as to distances from the monitoring bore. The plot 730 shows events with respect to magnitude and distance from the monitoring bore. Specifically, the plot 730 shows magnitudes from about −2.6 to about −0.2 over a distance of about 400 feet to about 1100 feet.

The Gutenberg-Richter relationship can relate number of events (N) and event magnitude (M), for example, via parameters a and b, which may be assigned an a-value and a b-value, respectively. The value of b may be about 1 within seismically active regions such that, for example, for a magnitude 4 event there will be 10 magnitude 3 events and 100 magnitude 2 events. Data indicate some variation of b-values in a range of about 0.5 to about 1.5 depending on tectonic environment. Also, for earthquake swarms, b-value may become as high as about 2.5, which indicates an even larger proportion of smaller events to larger ones.

Referring again to the plot 730, at individual distances, the number of events decreases with respect to magnitude. In other words, acquired data will be for more smaller events than for larger events as observations of higher magnitude events are exponentially less likely. However, given sensor technology and physics, higher magnitude events tend to be more readily detected, which can cause a detection-limit bias. In the single monitoring bore example of the survey 710 of FIG. 7, the detection-limit bias can manifest as a line-of-sight bias. Given such a bias, an analysis of event data can infer that a structural feature exists that has some alignment with the monitoring bore of the survey 710.

While FIG. 7 illustrates a single monitoring bore survey 710, the detection-limit bias applies to surveys where a detection-limit is not flat. In more complex surveys, a resulting bias or biases may infer one or more different types of structural features that may not exist. As an example, consider a survey geometry with two monitoring bores, one being to one side of a fracture and the other being to another side of the fracture, in such an example, a detection-limit effect may infer shapes more complex than line-of-sight.

As an example, a method can include calculating a b-value for a cluster of events. As an example, consider a frequency-magnitude distribution as a number-density distribution for observations made in a volume where the volume, for any given solid angle, increases with distance from sensors. As an example, a distance to an event may be a minimum distance from the event location to a sensor that is part of a monitoring sensor array and moment magnitude may be assumed for event magnitudes. At a detection limit, one may expect to observe some false events, which tend to have random magnitudes, however, such magnitudes tend to be strongly correlated to distance from the sensors. As an example, a method may include recovering the frequency-magnitude distribution iteratively by reconstructing the distribution against a detection-limit using, for example, a modified Lynden-Bell method, determining a Gutenberg-Richter b-value using a maximum likelihood estimate of Aki, and comparing the reconstructed distribution to the theoretical distribution using the Kolmogorov-Smirnov test. In such an example, if the reconstructed distribution is not a Gutenberg-Richter distribution with the proposed b-value (e.g., at about 5% significance), the method may include raising the detection level and re-computing the b-value. In such a manner, an estimate of b-value may be determined for a complete frequency-magnitude distribution and a detection limit curve.

As an example, consider the probability of an event occurring as following a Poisson distribution where event magnitude distribution may be governed by events occurring at weakest points in a formation. In such an example, the Gutenberg-Richter distribution can provide the number of events of magnitudes between $M_{Wmin}$ and $M_W$ via the following formulation:

$$N_{M_W} \propto (10^{-bM_{Wmin}} - 10^{-bM_W})$$

If a microseismic event profile recovered using the Lynden-Bell algorithm is Gutenberg-Richter distributed, the b-value may be estimated by Aki's maximum likelihood estimate, for example, according to the following formulation:

$$b = \frac{1}{2.3(\langle M_W \rangle - M_{Wmin})}$$

As an example, a method may include utilizing a statistical test, for example, where a recovered magnitude distribution differs (e.g. at about a 5 percent significance) from the Gutenberg-Richter distribution with an Aki estimated b-value. In such an example, one may reject the hypothesis that the recovered profile is Gutenberg-Richter distributed. An example of a significance test is the Kolmogorov-Smirnov test, for which cumulative profiles exist. As an example, a detection limit may be determined by ordering detectibilities, y, from smallest to largest, taking the next value of y (smallest), reconstructing a profile using the Lynden-Bell algorithm, calculating the Gutenberg-Richter b-value for a recovered profile using Aki's relation, determining whether the reconstructed profile is different to the Gutenberg-Richter profile (e.g., at about 5 percent significance) where, if true, continue by taking the next smallest value of y.

As an example, a b-value may vary during a treatment process, for example, from stage-to-stage. As an example, a method may determine a variation in b-value via placing confidence intervals on b-value estimates and then analyzing estimates to determine whether different b-values differ in a statistical sense.

As an example, where detection-limit information may be unavailable, a method may include setting a flat detection limit, for example, $M_{Wmin}=-2$ may be used. As to a count adjustment that may be associated with a correlation integral (see, e.g., description further below), a method may include averaging the likelihoods of observing an event at particular locations, for example, consider a pair-wise technique that may adjust a count according to the following formulation:

$$C_{adj} = \frac{e^{b\;ln(10)M_{Wt\_min}} + e^{b\;ln(10)M_{Wo\_min}}}{2e^{b\;ln(10)M_{W\_MIN}}}$$

In the foregoing equation, $C_{adj}$ is the adjusted count and can range from about zero to about one; b is an estimated b-value (e.g., for a cluster of events, etc.); $M_{Wt\_min}$ is the minimum detectable magnitude at a test event; $M_{Wo\_min}$ is the minimum detectable magnitude at an offset event; and $M_{W\_MIN}$ is the minimum detectable magnitude of a data-set.

As an example, the foregoing relationship for adjusting a count can account for the relative likelihood of observing events at different locations in space, for example, given the Gutenberg-Richter distribution with coefficient b and the detection-limit space described by the values of $M_{W\_min}$. As an example, total distance may then be calculated using a time-distance equivalence relationship:

$$s^2 = \left(\frac{\Delta d}{d_s}\right)^2 + \left(\frac{\Delta t}{t_s}\right)^2$$

where $s^2$ is the square of the distance measure used in calculating the spatial correlation coefficient; $d_s$ and $t_s$ are the equivalent distance and time measures respectively; and $\Delta d$ and $\Delta t$ are the spatial distance and temporal difference between the test event and the offset event. As an example, a separation measure may be defined, which may depend on, for example, distance, time, distance and time. For example, the distance measure s may be referred to as a separation measure. As an example, a method can include determining an individual correlation exponent via a technique that includes calculating correlation integral values with respect to a separation measure (e.g., separation measure values, etc.).

As an example, referring to the aforementioned time-distance equivalence relationship, a value for $d_s$ may be of the order of about 400 ft and, as an example, a value for $t_s$ may be of the order of about 5 minutes. As an example, one or more fracture length versus time relationships may be provided via a fracture simulator (e.g., consider the MANGROVE® engineered stimulation design package, Schlumberger Limited, Houston, Tex.).

As an example, a formulation may include a variety of parameters for events (e.g., or counts) represented by "N". For example, consider $N_{total}$ as a total number of pairs of distances (e.g., individual distances from a particular event to a number of other individual events), which may be a sum of adjusted counts $C_{adj}$ for distances $|X_i-X_j|<\infty$; consider $N_p$ as, for an event, a number of pairs (i,j) whose respective distance $|X_i-X_j|<l$, which may be an adjusted count via $C_{adj}$; and consider N as a total number of events. As an example, a notation may include a superscript, for example, consider a superscript "2" that indicates a pairwise approach as to events. As an example, $N_p/N_{total}$ may be a fraction of a total number of pairs where, for example, $N_p$ and $N_{total}$ may each be affected by an adjusted count approach. As an example, N can represent a total number of events where, in a singularity spectrum approach, a method can include making N calculations of separate D-values (see below, e.g., a correlation exponent as a metric).

As an example, a special case may be for a b-value of approximately zero where an adjusted count will be approximately unity (e.g. for a b-value of zero, $C_{adj}\equiv 1$).

As mentioned, a method may involve calculating one or more correlation integral values. For example, a correlation integral may be given as follows:

$$C(l) = \lim_{N\to\infty} \frac{1}{N_{total}} \times$$

{number of pairs $(i, j)$ whose distance $|X_i - X_j|$ is less than $l$}

In the foregoing equation, each value of l will have a corresponding count C, where $N_{total}$ is a total number of pairs. As may be appreciated, for a b-value of approximately zero where an adjusted count will be approximately unity, the portion of the foregoing correlation integral equation as to number of pairs whose distance is less than l will be an integer value. For example, if 50 pairs qualify as having a distance that is less than l, the number of qualifying pairs will be 50 (e.g., which may be represented as $N_p$). If a total number of pairs ($N_{total}$) in a dataset is 100, the correlation integral value for the particular value of l will be 0.5 (e.g., 50/100). A method that implements an adjusted count acts to diminish the contribution of counts where a b-value is not zero; noting that an adjusted count can also adjust for one or more detection limits (e.g., where a b-value is not zero).

As an example, the count total for a particular event, $N_p$, which is from the perspective of that particular event, may be the sum of adjusted counts relative to that event. This means that the value of $N_p$ seen by one event can be different from that seen by another event within the same set of events as can a total number of counts, $N_{total}$. Therefore, if a method aims to adjust to reduce observational bias, one may expect $N_p$ to be different for different individual events and so a singularity spectrum may be the appropriate representation for an individual event, rather than a single correlation coefficient for a dataset as a whole.

The correlation integral by itself can carry information about an event relative to other events in a geologic environment. Further, as an example, a number of correlation integral values may be determined for a number of lengths (e.g., distance, time or distance/time). In such an example, the following relationship may provide a metric referred to as a correlation exponent v or as a "D-value":

$$C(l)\sim l^v$$

As an example, a log-log plot of C(l) values versus l may be fit via a regression analysis, for example, to provide an estimate of v or D-value. A D-value may be understood according to one or more mathematical frameworks, for example, consider a topological framework, a fractal framework or a probabilistic framework.

Referring again to FIG. 7, the method 750 can include a reception block 752 for receiving event-related data and a determination block 754 for determining a plurality of b-value adjusted individual D-values for corresponding individual microseismic events associated with one or more fracturing operations performed in a geologic environment (e.g., based at least in part on the event-related data).

As an example, one or more computer-readable storage media (see, e.g., the blocks 753 and 755) can include computer-executable instructions to instruct a computer to: receive data and determine a plurality of b-value adjusted individual D-values for corresponding individual microseismic events associated with one or more fracturing operations performed in a geologic environment (e.g., based at least in part on received data). As an example, instructions can include instructions to instruct a computer to adjust counts of correlation integrals based at least in part on a b-value. As an example, instructions can include instructions to instruct a computer to implement a count adjusting equation that depends on b-value and event magnitude.

Figure 8:
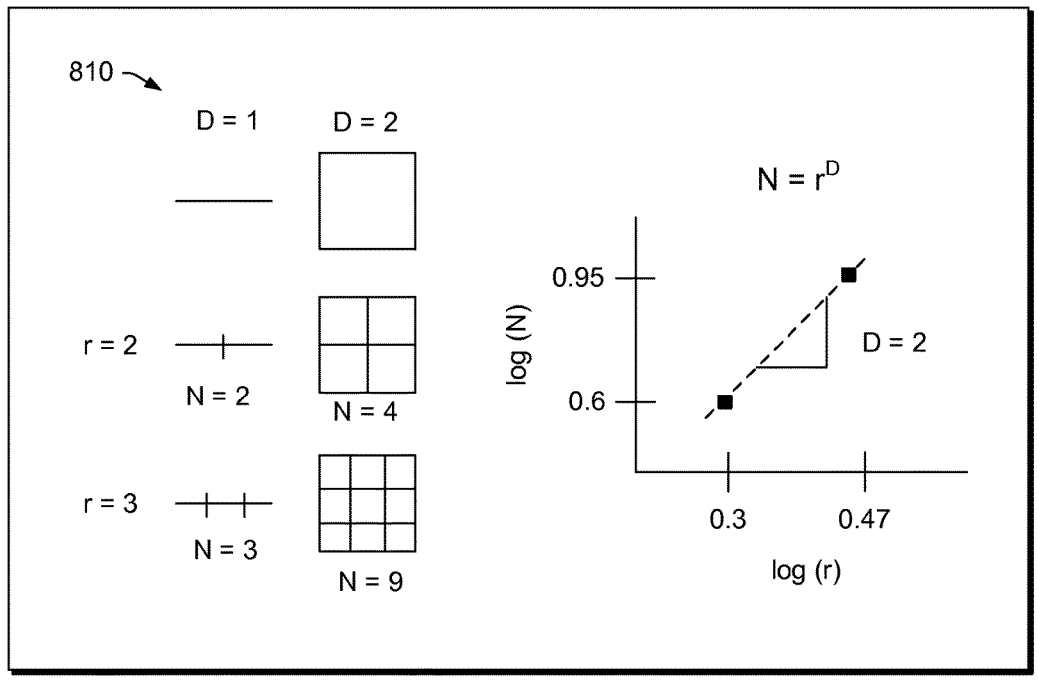
FIG. 8 illustrates examples of mathematical frameworks as to dimensionality.
Figure 8:
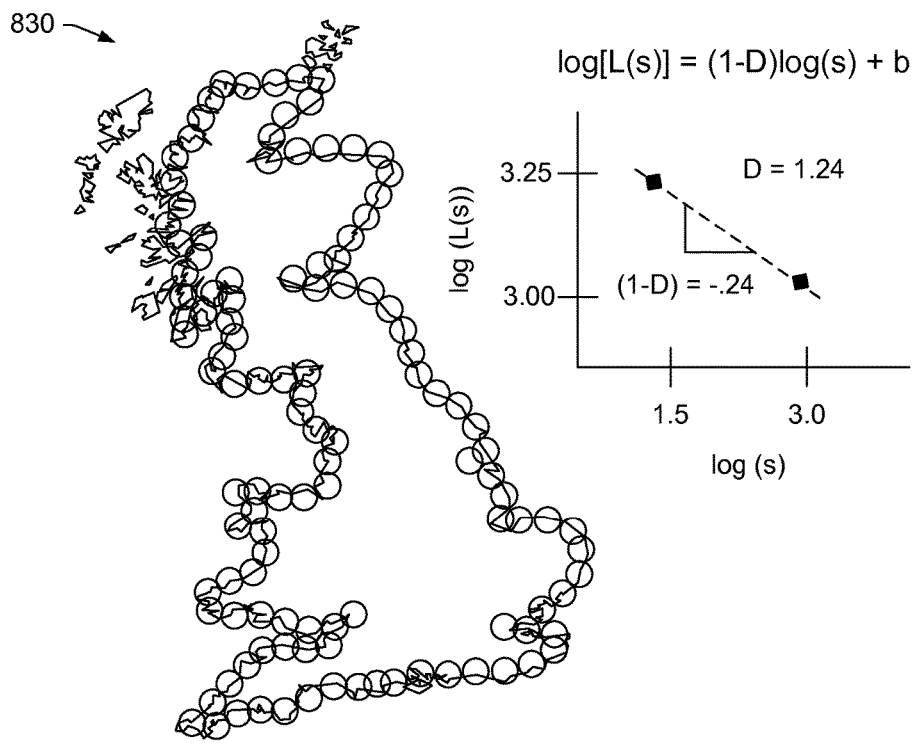

FIG. 8 shows an example of a D-value in a mathematical framework 810 and in a mathematical framework 830 where, in both, the D-value may be referred to as a Hausdorff dimension or Hausdorff-Besicovitch dimension. The Hausdorff dimension of a point is zero, the Hausdorff dimension of a line is one, and the Hausdorff dimension of the plane is two. As an example, fractals may be defined as sets with corresponding noninteger Hausdorff dimensions where, for example, a Hausdorff dimension may exceed a topological dimension.

In the example mathematical framework 810 of FIG. 8, consider two objects residing in Euclidean space with Euclidean dimensions D=1 and D=2, respectively, and reducing their linear size by 1/r in each spatial direction. In such an example, an equation may be formulated where, given N (e.g., a number of measures) and r, D may be determined: $N=r^D$. For example, by plotting log(N) versus log(r), the slope may be determined as D or, for example, as an estimate of D.

As to the example mathematical framework 830 of FIG. 8, an estimated length, L, equals the length of a ruler, s, multiplied by N, the number of such rulers needed to cover a measured object. As shown, the object may be a coastline of a landmass such as Great Britain where a number N of lengths of a ruler s (e.g., circles) may cover the coastline. In such an example, where s is small, N is large and for a "well-behaved" set, the Hausdorff dimension is the unique number D such that N grows as $1/s^D$ as s approaches zero.

In a formal analysis, Mandelbrot assigned the term "(1-D)" to be a slope of an equation: log [L(s)]=(1-D)log(s)+b where D is the Hausdorff dimension. As to the coastline of Great Britain, it may have a Hausdorff dimension of about 1.24; for comparison, consider that the coastline of Norway may have a Hausdorff dimension of about 1.52 and that the Hausdorff dimension of broccoli may be about 2.66. Thus, in a fractal framework, the Hausdorff dimension of a fractal that can be drawn from a line may be between 1 and 2 and have infinite points and finite length while the Hausdorff dimension of a fractal created from a shape on a plane may be between 2 and 3 and have infinite length and finite area.

As an example, a correlation integral value may be determined with respect to a signal that varies with respect to time. For example, consider a set of differential equations such as the Lorenz equations that can be solved to provide locations with respect to times. Specifically, the Lorenz equations can have chaotic solutions for certain parameter values and initial conditions. Such solutions may define an attractor that can be plotted in a three-dimensional coordinate space where the attractor may resemble a butterfly or figure eight.

As an example, for a fracture in a geologic environment, dimensionality (e.g., such as that represented by a D-value) may indicate whether an event is, with respect to other events, associated with a structural feature that has characteristics of a plane. For example, qualitatively, for higher-dimensional objects, there may be more ways for points to be close to each other and so the number of pairs close to each other will rise more rapidly for higher dimensions. As an example, D-values that are greater than about 2 may be of lesser interest where fractures are considered to include linear and/or planar features.

As an example, a hydraulic fracturing process may be assumed to be a Poisson process with spatial constraints (e.g. constrained by a geomechanical system perturbed by hydraulic fracturing). While such an example may not be considered mathematically deterministic, it may nonetheless be considered physically constrained such that points may be randomly scattered about one or more constraining features. As an example, the chaotic solutions to the Lorenz equations may form an attractor that is considered to be "constrained" by the Lorenz equations and their respective parameter values for behavior with respect to time.

As an example, a hydraulic fracturing process may be considered to be a physically constrained Poisson process where an individual event may be characterized with respect to other individual events through calculation of correlation integral values with respect to distances. As an example, a relationship that considers a correlation exponent (e.g., v) to be approximately a D-value, which is less than a number of degrees of freedom (e.g., F), may imply a constraint. In an attractor sense, for an experimental signal, where v is less than F, the experimental signal stems from deterministic chaos rather than random noise as random noise will result in v equal to F. As to a hydraulic fracturing scenario, spatial (and/or temporal) constraints can exist that impose a condition that v is less than F. An analysis may aim to uncover aspects of spatial structure(s) associated with such constraints because they can relate to structures of interest in a reservoir such as fractures and faults.

In an attractor framework applied to, for example, fluid flow, a strange attractor may arise when flow does not contract a volume element in all directions, but stretches it in some directions. For a geologic environment, presence of a hydraulic fracture and natural fractures and faults can cause a Poisson process to be "stretched in some directions" thereby, by analogy, giving the appearance of a strange attractor in a deterministic chaos dataset (e.g., again, v is less than F).

As an example, a method may include performing a singularity spectrum analysis. For example, a singularity spectrum may be a function that can describe a fractal dimension of a subset of points of a function belonging to a group of points that may have the same Holder exponent. A singularity spectrum analysis may provide a value as to how "fractal" a set of points is in a function. For example, the singularity spectrum $D_{ss}(\alpha)$ of a function $f(x)$ may be defined as follows:

$$D_{SS}(\alpha)=D\{x,\ \alpha(x)=\alpha\}$$

where a(x) is the function describing the Holder exponent a(x) of $f(x)$ at the point x and where D{ } is the D-value or Hausdorff dimension of a point set.

Figure 9:
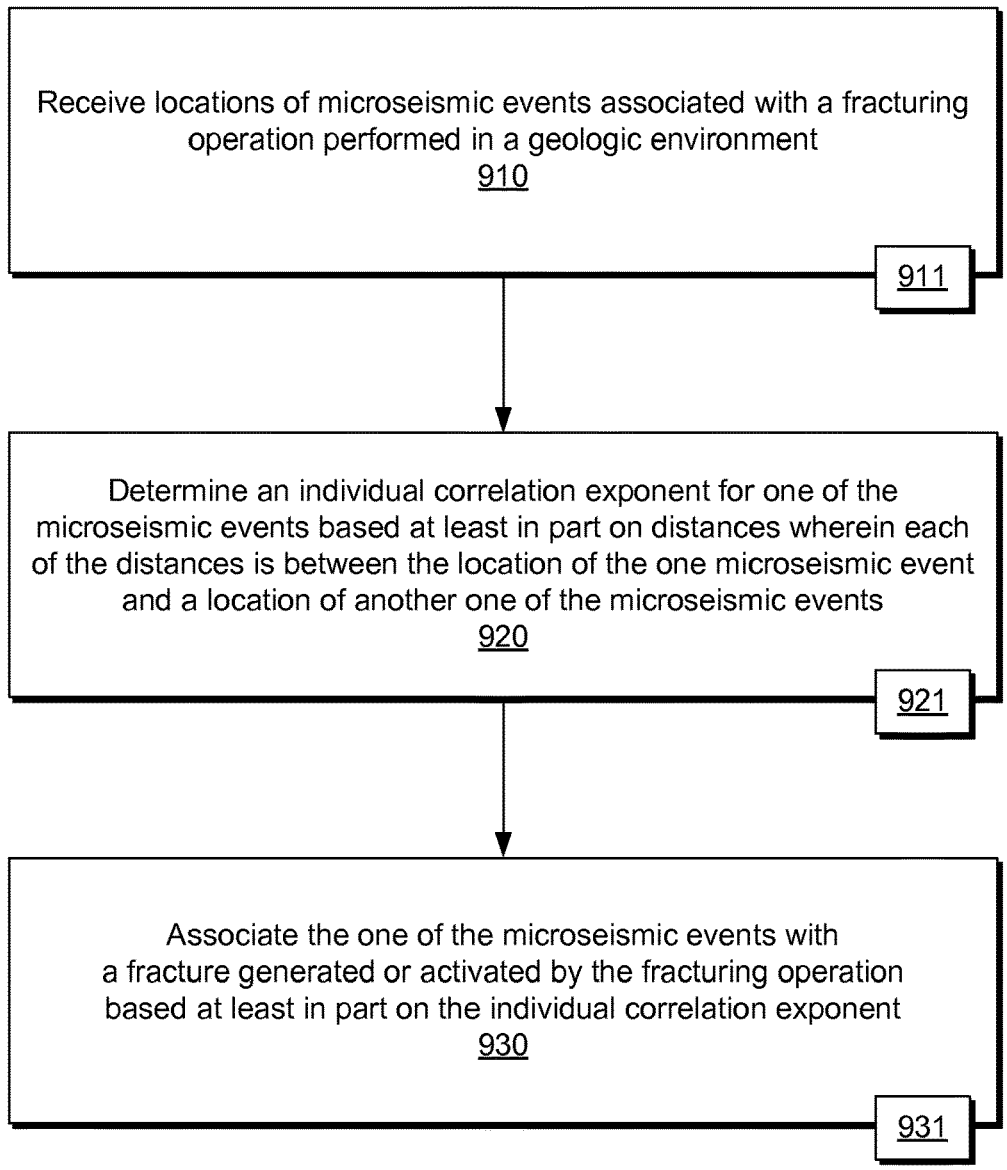
FIG. 9 illustrates an example of a method.

FIG. 9 shows an example of a method 900 that includes a reception block 910 for receiving locations of microseismic events associated with a fracturing operation performed in a geologic environment; a determination block 920 for determining an individual correlation exponent for one of the microseismic events based at least in part on distances where each of the distances is between the location of the one microseismic event and a location of another one of the microseismic events; and an association block 930 for associating the one of the microseismic events with a fracture generated or activated by the fracturing operation based at least in part on the individual correlation exponent. In such an example, the correlation exponent may be a D-value. As an example, a method may include determining a D-value based in part on a singularity spectrum analysis.

As an example, the method 900 may further include determining individual correlation exponents for a plurality of the microseismic events. In such an example, the method may include filtering the individual correlation exponents to generate a group of the microseismic events. Given such a group, a method may include associating at least a portion of the group with one or more fractures generated by a fracturing operation or fracturing operations. As an example, a method may include analyzing information to determine whether a fracture is a new fracture or an activated pre-existing fracture (e.g., as failure mechanisms may differ). Such an analysis may include assessing one or more b-values, optionally in conjunction with one or more D-values and/or other data (e.g., consider seismic data as to P-waves, S-waves, etc.). For example, a b-value of a generated hydraulic fracture may be higher than a b-value of an activated pre-existing fracture.

As an example, a method can include determining an individual correlation exponent at least in part by calculating correlation integral values with respect to a separation measure, which may be, for example, dependent on distance, time or distance and time. In such an example, the calculating correlation integral values can include adjusting at least one count for one microseismic event with respect to another microseismic event based at least in part on a magnitude of the one microseismic event and a magnitude of the other microseismic event. As an example, a method can include calculating correlation integral values and adjusting at least one count for one microseismic event with respect to another microseismic event based at least in part on a b-value that relates a number of microseismic events and microseismic event magnitude.

As an example, a method may include adjusting a count of a correlation integral for reducing a detection-limit bias, for example, as associated with acquisition of microseismic event data.

The method 900 may be associated with various computer-readable media (CRM) blocks or modules 911, 921 and 931. Such blocks or modules may include instructions suitable for execution by one or more processors (or processor cores) to instruct a computing device or system to perform one or more actions. As an example, a single medium may be configured with instructions to allow for, at least in part, performance of various actions of the method 900. As an example, a computer-readable medium (CRM) may be a computer-readable storage medium (e.g., a non-transitory medium) that is not a carrier wave.

Figure 10:
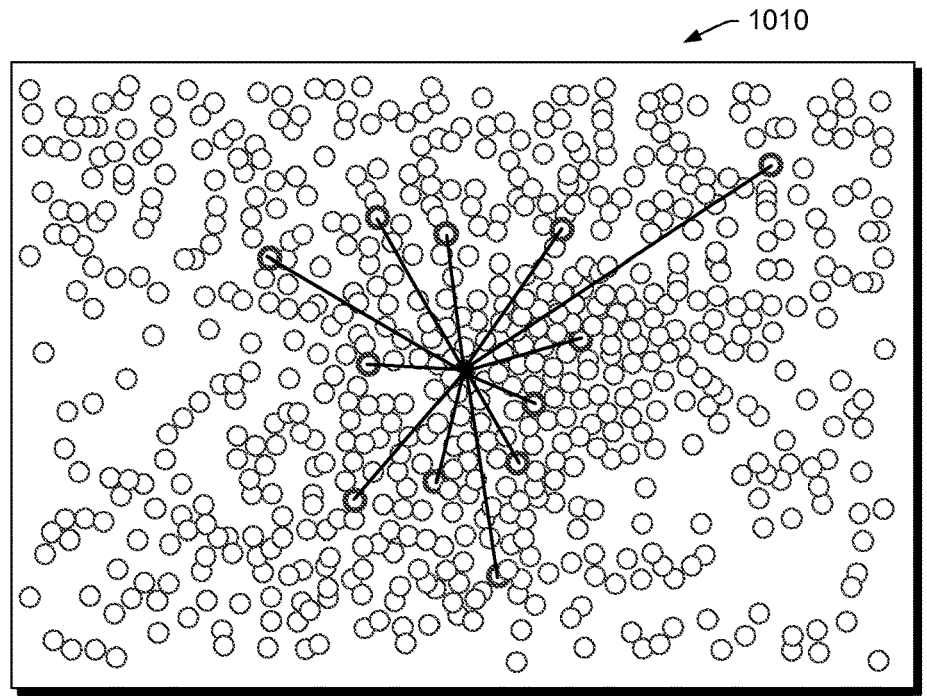
FIG. 10 illustrates an example of locations of microseismic events, an example of a plot of data associated with microseismic events and an example of a method.
Figure 10:
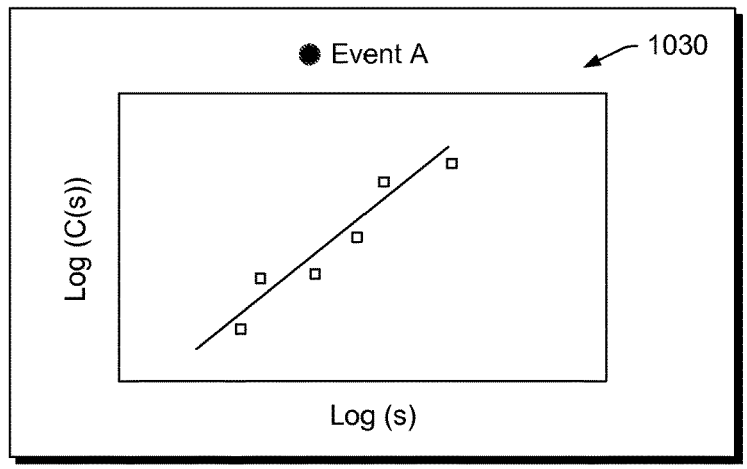
Figure 10:
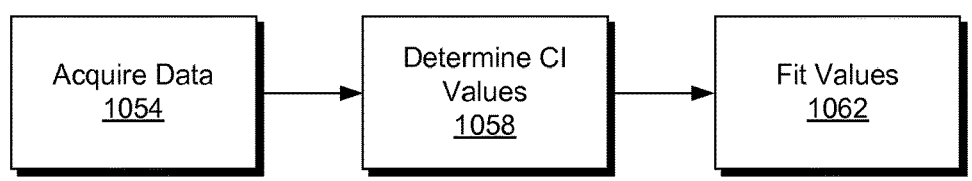

FIG. 10 shows example locations 1010 of microseismic events in a space that may be a three-dimensional space. For example, microseismology may be performed during a fracturing operation where acquired seismic data are analyzed to determine hypocenters of microseismic events with respect to a three-dimensional coordinate system (e.g., x, y and z). As an example, if time and distance are to be used, then an equivalence may be defined (e.g., stated as X meters is equivalent to Y minutes separation).

Given the locations 1010, optionally together with information such as magnitude of respective events, an analysis may be performed that includes determining correlation integral values for at least one selected test event with respect to selected other events. For example, FIG. 10 shows a solid circle that represents a test event and open circles with thick line borders that represent some other events. Distances may be determined between the test event location and the locations of the other events.

As mentioned, an object that is linear (e.g., one-dimensional) may have fewer ways to have close neighbors; whereas, an object that is of a higher dimension may have more ways to have close neighbors. More ways of having close neighbors may translate into high counts for short distances. Where points of correlation integral values are plotted against distance values using a log-log plot, the slope of a line fit to the points may be steeper where close neighbors exist and where the number of neighbors declines with respect to distance.

As an example, a method may include analyzing a single event with respect to other events and assigning that single event a dimensionality parameter such as a D-value. Where the D-value of that single event is greater than unity, it may be associated with a multidimensional structural feature of a geologic environment. Where a plurality of events are analyzed and assigned D-values, events that fall within a selected D-value range and that may be approximately "aligned" with respect to a plane may be associated with a particular planar fracture. Where a path of an injection bore may be known, an analysis may include approximating at least the location of a fracture with respect to the injection bore. For example, consider locating wings of a fracture with respect to an injection bore. As another example, consider locating a plurality of fractures with respect to an injection bore.

FIG. 10 also shows an example of a log-log plot 1030 of correlation integral values versus values for a separation measure (e.g., as a dimension associated with an axis of the plot 1030). As an example, such a plot may be generated based on correlation integral values determined using locations of microseismic events such as the locations 1010.

FIG. 10 additionally shows an example of a method 1050 that includes an acquisition block 1054 for acquiring data, a determination block 1058 for determining correlation integral (CI) values and a fit block 1062 for fitting a model to correlational integral values and values for a separation measure.

As an example, where values are log values, a fit may include linear regression to determine a slope. As an example, a level of fit (e.g., a target $R^2$ for line fitting) may be selected. As an example, a method may include specifying a number of events to ignore (e.g., at short distances) or, for example, a minimum distance (e.g., a distance below which one observes a Poisson process and the random scatter in event locations due to pick errors and the like), from which a number of events to be discarded may be calculated. As an example, fitting may occur in an iterative process where certain values (e.g., event pairs) may be removed. Such an approach may be implemented in an effort to achieve a level of fit.

As an example, a method may include selecting an event (microseismic signal location); calculating distances s, to other events (e.g., i=1 to N:$s_1$, $s_2$, $s_3$, ..., $s_N$); sorting the distances for N points; calculating for at least some distances (e.g., "s" along a distance dimension, which may be a separation measure dependent on distance, time, distance and time) that include at least a portion of the distances $s_1$ to $s_N$, corresponding correlation integral values C(s); and, from a log-log plot of log [C(s)] versus log(s), fitting a straight line to get a correlation exponent that is the D-value for the selected event. Such a method may also include adjusting counts of a correlation integral to diminish detection-limit bias and observational bias as may be introduced by having a distribution of event magnitudes.

As an example, a method may be applied where structure of reservoir features is uncertain or unknown. Where a plurality of correlation exponent values is determined for a corresponding plurality of individual events, a method may include plotting/filtering of events based on correlation exponent values. Such an approach may help to avoid, for a detection-limited data-set and/or a distribution of magnitudes, the problem that each event may have a different effective Np so that a simple calculation over an entire data-set would be erroneous. Filtering on correlation exponent can help to remove randomly distributed events (e.g., those due to measurement noise and/or more general failure zones where a Poisson process is unconstrained), allowing interpretation of the events that see a constrained distribution (e.g., where one is interested in determining linear/planar reservoir features that act as constraints).

Where a method includes adjusting correlation integral counts based at least in part on b-values, one or more types of observation and/or detection bias may be reduced. As an example, a method that includes calculating correlation integral values to determine one or more event specific dimension metrics, information as to maximum horizontal stress orientation (e.g., which can govern fracture propagation) may be more readily determined. For example, by sorting or filtering based on D-values, an event and its location may be associated with a planar fracture (e.g., D-value<=2) or a dendritic fracture (e.g., D-value>=2). Where microseismic data are available over time, a method may include analyzing the progression of features, for example, consider a planar fracture becoming more dendritic over time, which may be a process associated with a ratio between the maximum and minimum horizontal stresses.

As an example, a workflow may include simulating fractures. As an example, consider simulating complex fractures in shale reservoirs. As mentioned, fractures may be generated artificially, for example, via hydraulic fracturing. Hydraulic fracturing may be considered a stimulation treatment that may aim to enhance recovery of one or more resources from a reservoir or reservoirs.

As an example, a simulation framework may include one or more modules that can model stimulation of a geologic environment, for example, to generate one or more fractures. For example, consider the commercially available MANGROVE® engineered stimulation design package that may be operated in conjunction with a framework such as, for example, the PETREL® framework (e.g., optionally in the OCEAN® framework). The MANGROVE® package may be operated as a hydraulic fracturing simulator and may be, for example, integrated into one or more seismic-to-simulation workflows (e.g., for conventional and/or unconventional reservoirs). As an example, the MANGROVE® package may be implemented to grid and model complex fractures, which may be used for reservoir simulation.

As an example, stimulation design functionality may be implemented to predict realistic fracture scenarios. For example, consider functionality that can provide for simulation of nonplanar hydraulic fractures using an unconventional fracture model (UFM) and/or wiremesh model. As an example, a UFM may be implemented as to natural fractures (e.g., a naturally fractured reservoir).

Stimulation design may integrate one or more of geological and geophysical (G&G), petrophysical, geomechanical, and microseismic data. Stimulation modeling may help to increase productivity and, for example, reduce use of fracturing materials (e.g., fluid, proppant, etc.).

As an example, a stimulation design package may be implemented as a part of a workflow that aims to optimize well completion designs. As a poorly completed well is not likely to produce at maximum potential, an engineered process based on reservoir characterization may provide better completion designs. Whether input is G&G data via 3D models, well logs, offset wells, or pilot wells, completion and stimulation designs may be customizable to increase return on investment (ROI) by producing the reservoir more effectively.

A stimulation design workflow may provide estimates of proppant placement, fracture network dimensions, and reservoir penetration based on properties such as rheology, leakoff pressure, friction performance, permeability, and closure stress.

As an example, a feedback loop may be implemented to compare simulations to actual results. For example, real-time data, such as that acquired by a hydraulic fracture mapping service (e.g., consider StimMAP as a stimulation mapping service of Schlumberger Limited, Houston, Tex.) may be analyzed and compared to simulated results (e.g., to help to optimize treatments as they are being performed). Such comparisons may help improve well planning and reduce operational risks.

As an example, if it is assumed that a geologic environment includes complex fracturing of the style that a UFM model may show, then a D-value greater than or equal to about 2 can indicate that individual planar fractures may be too closely spaced to resolve separately with the event locations. And, a D-value less than or equal to about 2 can indicate that planar fractures are at a spacing where individual fractures can be resolved. These two scenarios may occur, for example, where the b-value of the first scenario may be the same as the b-value for the second scenario.

Figure 11:
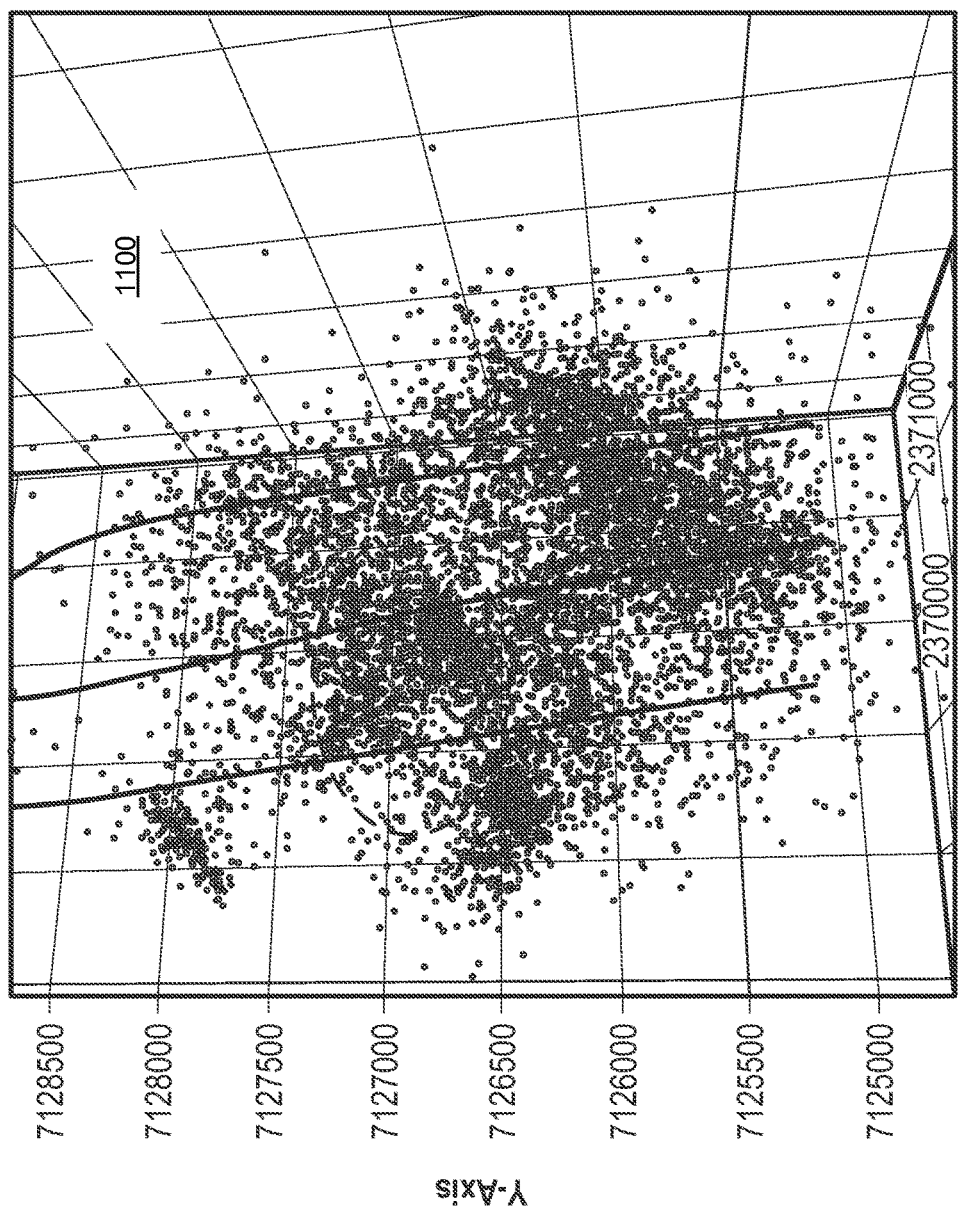
FIG. 11 illustrates an example of a plot of locations of microseismic events.
Figure 12:
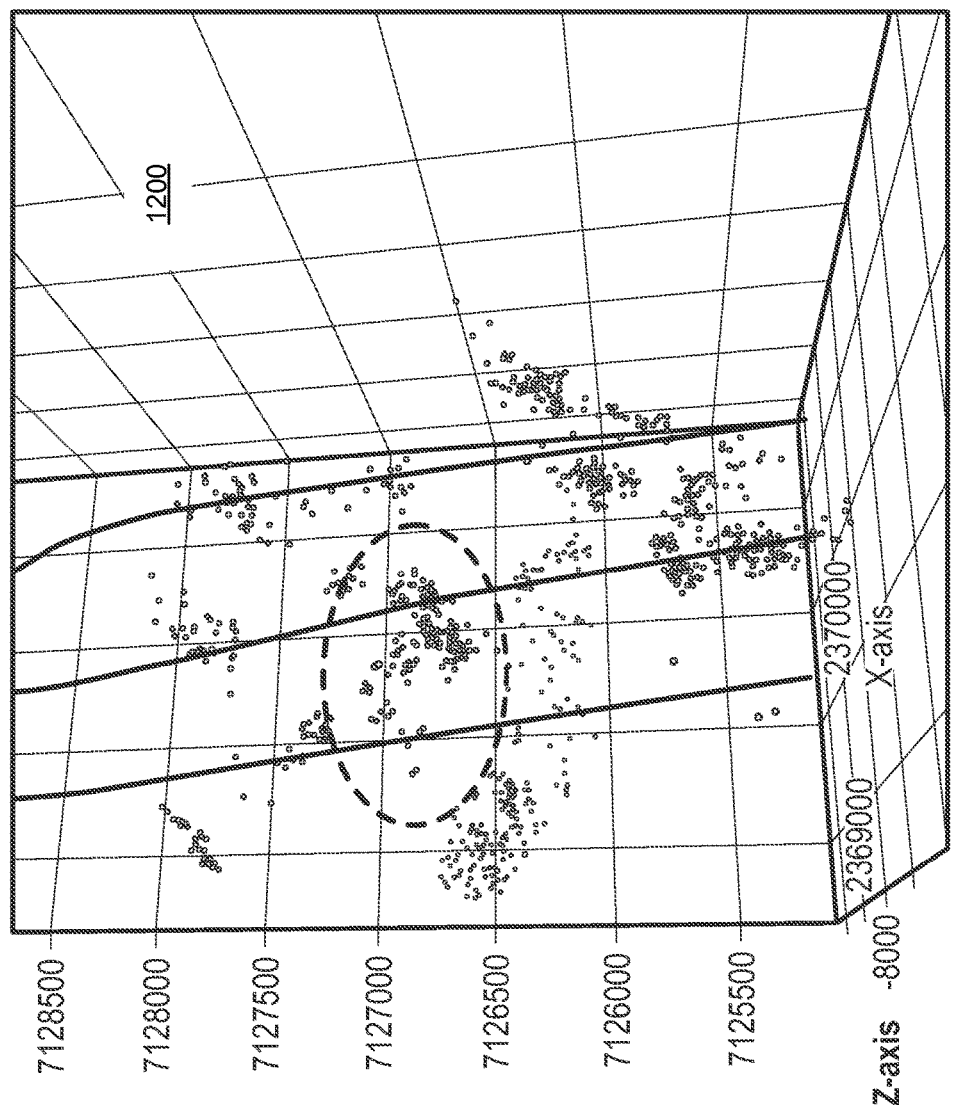
FIG. 12 illustrates an example of a plot of locations of microseismic events as filtered based on D-values.
Figure 13:
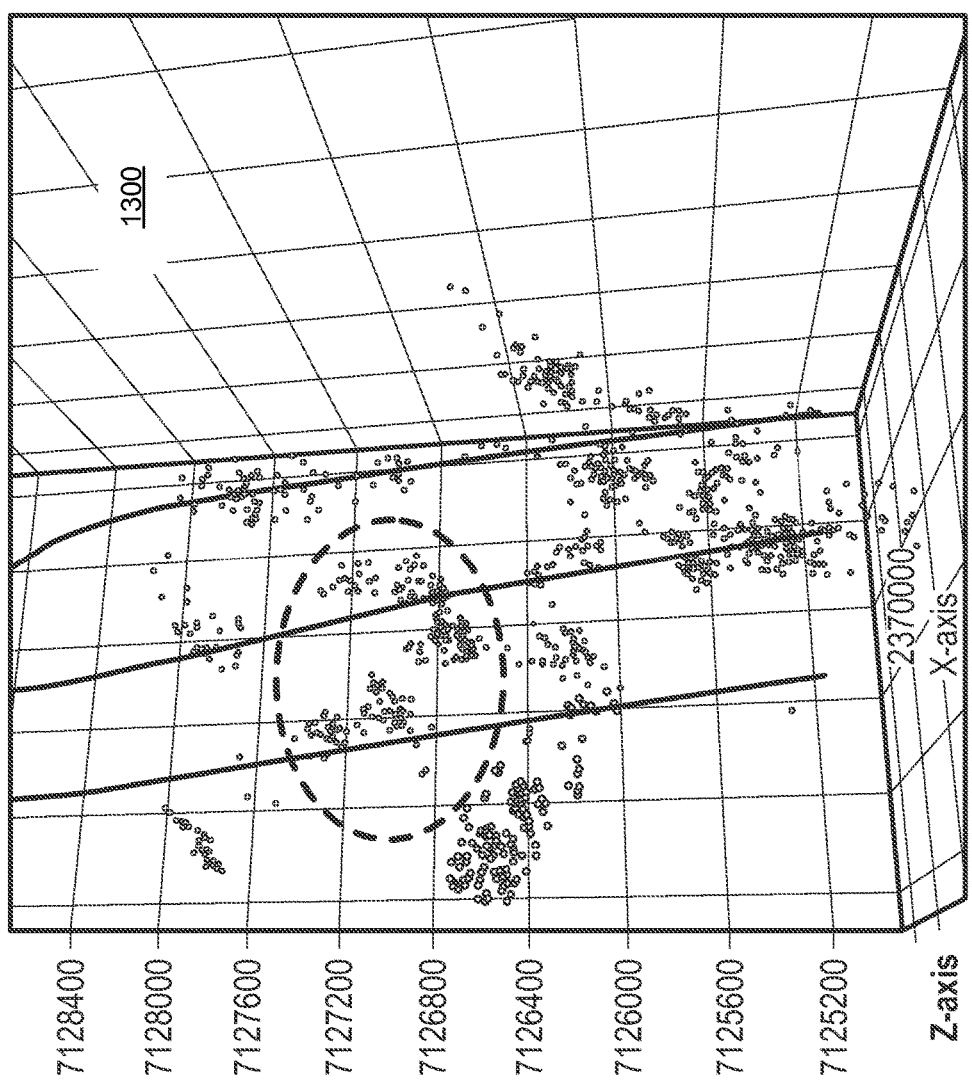
FIG. 13 illustrates an example of a plot of locations of microseismic events as filtered based on D-values adjusted to reduce bias.

FIGS. 11, 12 and 13 show an example of a method as applied to acquired data. FIG. 11 shows a plot 1100 of a cloud of locations of microseismic events along with three bore paths, which are for bores that include lateral or horizontal sections. The events of the plot 1100 are associated with a multi-stage hydraulic fracturing operation in a geologic environment (e.g., a multi-stage stimulation treatment). As may be appreciated, the number of events is many; as such, interpretation of features such as fractures generated via application of fluid pressure in one or more of the bores may present some difficulties. As an example, a method may be applied to the data whereby individual events are assigned a metric such as a D-value. In turn, filtering may be applied to generate a group of events, for example, based on one or more filtering criteria.

FIG. 12 shows a plot 1200 of a group of events resulting from filtering of the cloud of events of the plot 1100 of FIG. 11. For example, a filter criterion as to D-value may be used to generate a group of events that are likely to be associated with underlying planar/linear structures. To generate the plot 1200, a filtering criterion of D-value being less than or equal to 2 was implemented. In the plot 1200, an oval formed by a dashed line indicates a region where some uncertainty may exist as to structural features at least in part due to observational bias.

FIG. 13 shows a plot 1300 of filtered D-values with respect to locations of microseismic events where a b-value based bias adjustment has been implemented in calculating correlation integral values that are used for determination of the individual event D-values. As such, the filtering as applied to generate the group of FIG. 13 generates a group that differs from that generated by the filtering of FIG. 12. Specifically, the difference in the two groups is due to a reduction of detection-limit bias, i.e., the group of FIG. 13 exhibits less bias than the group of FIG. 12.

In comparing the plot 1200 of FIG. 12 and the plot 1300 of FIG. 13, one may note that without accounting for b-value (the plot 1200), data may lead to an impression of linked fractures; whereas, with accounting for b-value (the plot 1300), the region becomes more definable with respect to fractures, specifically, demonstrating that separations exist that indicate lack of linking.

The plots 1100, 1200 and 1300 of FIGS. 11, 12 and 13 demonstrate efficacy of a method that analyzes data and that assigns D-values to individual event, as located in space. Further, where desired, D-values may be adjusted where such adjusting depends on b-value (e.g., as may be implemented while calculating a correlation integral value). A comparison of the plots 1200 and 1300 demonstrate that an attempt to correlate D-value and b-value can benefit from a careful review against how an adjustment may be performed (e.g., error in the b-value introduces some correlation in an adjustment), particularly, in an unadjusted case as detection-limit effects can introduce some correlation.

As an example, a method that includes calculating correlation integral values may be referred to as a singularity spectrum method. Such a method may include determining a correlation exponent or D-value and optionally include adjusting, for example, based at least in part on a b-value and/or microseismic event magnitudes.

As an example, a method may be implemented without guidance from interpretation as, for example, a method may operate on microseismic data such as data that includes location and magnitude information.

As an example, a system can include a processor; memory operatively coupled to the processor; and one or more modules that include processor-executable instructions stored in the memory to instruct the system to receive locations of microseismic events associated with a fracturing operation performed in a geologic environment; and determine an individual correlation exponent for one of the microseismic events based at least in part on distances where each of the distances is between the location of the one microseismic event and a location of another one of the microseismic events. Such a system may include one or more modules that include processor-executable instructions stored in the memory to instruct the system to, based at least in part on the individual correlation exponent, associate the one of the microseismic events with a fracture generated or activated by the fracturing operation. As an example, a separation measure may be used to determine, at least in part, an individual correlation exponent where the separation measure may be based on distance, time, distance and time.

As an example, a system can include one or more modules that include processor-executable instructions stored in memory to instruct the system to determine individual correlation exponents for a plurality of microseismic events. As an example, an individual correlation exponent may be a D-value of a microseismic event. As an example, a system can include one or more modules that include processor-executable instructions stored in memory to instruct the system to filter individual correlation exponents for corresponding microseismic events to generate a group of microseismic events. As an example, one or more modules may include processor-executable instructions to instruct a system to associate at least a portion of a group with one or more fractures generated by a fracturing operation or fracturing operations.

As an example, a system can include one or more modules that include processor-executable instructions stored in memory to instruct the system to calculate correlation integral values with respect to a separation measure.

As an example, one or more computer-readable storage media can include computer-executable instructions to instruct a computer to: determine a plurality of b-value adjusted individual D-values for corresponding individual microseismic events associated with one or more fracturing operations performed in a geologic environment. As an example, the one or more computer-readable storage media can include computer-executable instructions to instruct a computer to adjust counts of correlation integrals based at least in part on a b-value. As an example, one or more computer-readable storage media can include computer-executable instructions to instruct a computer to implement a count adjusting equation that depends on b-value and event magnitude.

As an example, a workflow may be associated with various computer-readable media (CRM) blocks. Such blocks generally include instructions suitable for execution by one or more processors (or cores) to instruct a computing device or system to perform one or more actions. As an example, a single medium may be configured with instructions to allow for, at least in part, performance of various actions of a workflow. As an example, a computer-readable medium (CRM) may be a computer-readable storage medium. As an example, blocks may be provided as one or more modules, for example, such as the one or more modules 270 of the system 250 of FIG. 2.

Figure 14:
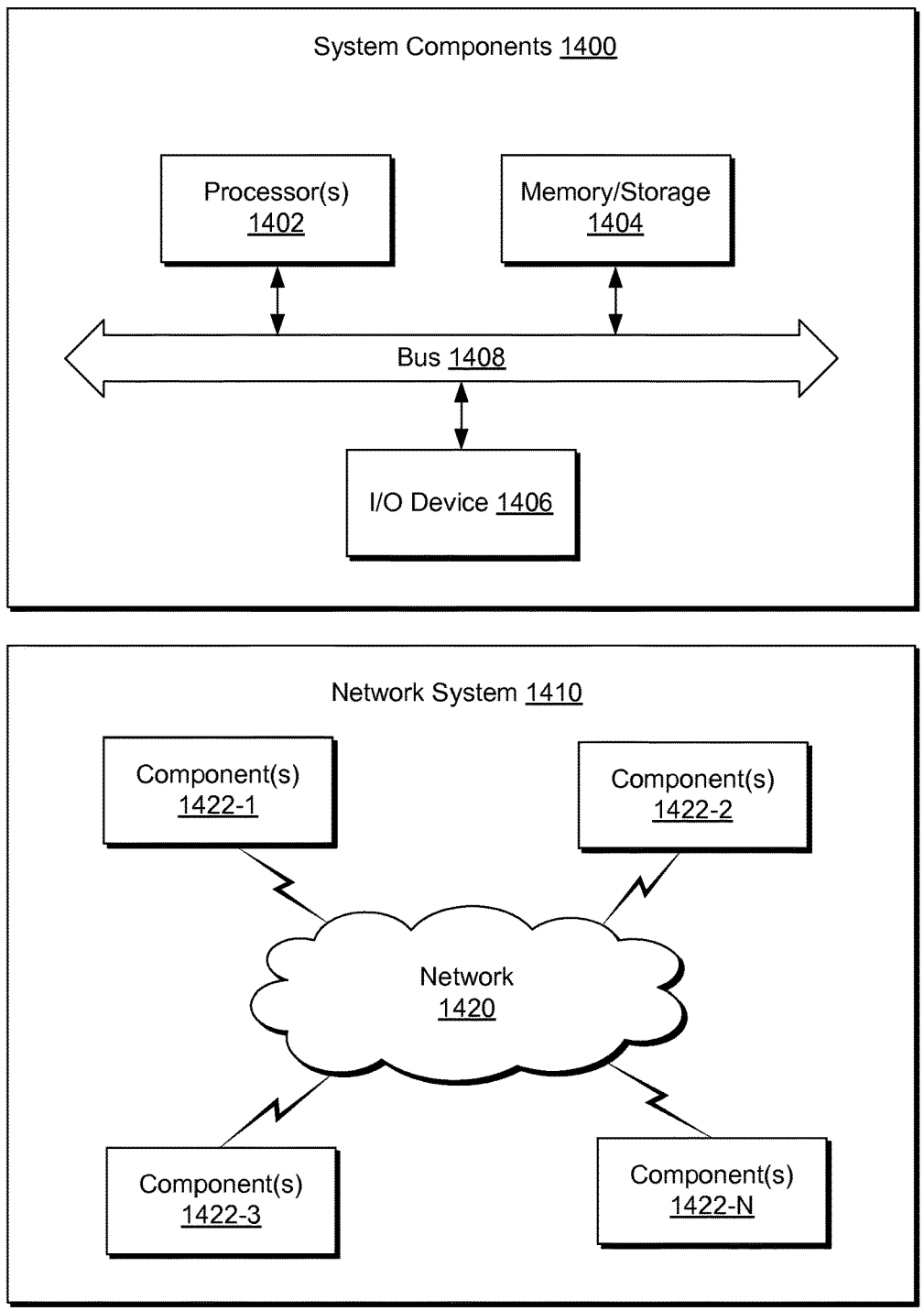
FIG. 14 illustrates example components of a system and a networked system.

FIG. 14 shows components of an example of a computing system 1400 and an example of a networked system 1410. The system 1400 includes one or more processors 1402, memory and/or storage components 1404, one or more input and/or output devices 1406 and a bus 1408. In an example embodiment, instructions may be stored in one or more computer-readable media (e.g., memory/storage components 1404). Such instructions may be read by one or more processors (e.g., the processor(s) 1402) via a communication bus (e.g., the bus 1408), which may be wired or wireless. The one or more processors may execute such instructions to implement (wholly or in part) one or more attributes (e.g., as part of a method). A user may view output from and interact with a process via an I/O device (e.g., the device 1406). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1410. The network system 1410 includes components 1422-1, 1422-2, 1422-3, . . . 1422-N. For example, the components 1422-1 may include the processor(s) 1402 while the component(s) 1422-3 may include memory accessible by the processor(s)

1402. Further, the component(s) 1402-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
    monitoring seismic emissions during a fracturing operation in a geologic environment via one or more sensors to generate microseismic data;
    determining, via a computing system, locations of microseismic events, wherein the locations are based at least in part on at least a portion of the microseismic data;
    determining, via the computing system, an individual correlation exponent for one of the microseismic events based at least in part on distances wherein each of the distances is between the location of the one microseismic event and a location of another one of the microseismic events, and wherein the individual correlation exponent distinguishes chaos from random noise;
    based at least in part on the individual correlation exponent, associating, via the computing system, the one of the microseismic events with a fracture generated or activated by the fracturing operation; and
    determining, via the computing system, a direction of growth of the fracture in the geologic environment based at least in part on the one of the microseismic events associated with the fracture.

2. The method of claim 1 wherein the individual correlation exponent is a D-value of the one of the microseismic events as estimated via a relationship between microseismic event-based counts and a dimension.

3. The method of claim 1 wherein the determining an individual correlation exponent comprises implementing a singularity spectrum analysis.

4. The method of claim 1 comprising determining individual correlation exponents for a plurality of the microseismic events.

5. The method of claim 4 comprising filtering the individual correlation exponents to generate a group of the microseismic events.

6. The method of claim 5 comprising associating at least a portion of the group with the fracture or another fracture generated or activated by the fracturing operation.

7. The method of claim 1 wherein determining an individual correlation exponent comprises calculating correlation integral values with respect to a separation measure.

8. The method of claim 7 wherein calculating correlation integral values comprises adjusting at least one count for the one microseismic event with respect to another one of the microseismic events based at least in part on a magnitude of the one microseismic event and a magnitude of the other one of the microseismic events.

9. The method of claim 7 wherein calculating correlation integral values comprises adjusting at least one count for the one microseismic event with respect to another one of the microseismic events based at least in part on a b-value that relates a number of microseismic events and microseismic event magnitude.

10. The method of claim 1 wherein the determining an individual correlation exponent for one of the microseismic events comprising adjusting for a detection-limit bias.

11. The method of claim 1 comprising determining the direction of growth of the fracture in the geologic environment during the fracturing operation.

12. A system comprising:
    a processor;
    memory operatively coupled to the processor; and
    processor-executable instructions stored in the memory to instruct the system to monitor seismic emissions during a fracturing operation in a geologic environment via one or more sensors to generate microseismic data;
determine locations of microseismic events, wherein the locations are based at least in part on at least a portion of the microseismic data;
determine an individual correlation exponent for one of the microseismic events based at least in part on distances wherein each of the distances is between the location of the one microseismic event and a location of another one of the microseismic events, and wherein the individual correlation exponent distinguishes chaos from random noise;
based at least in part on the individual correlation exponent, associate the one of the microseismic events with a fracture generated or activated by the fracturing operation; and
determine a direction of growth of the fracture in the geologic environment based at least in part on the one of the microseismic events associated with the fracture.

13. The system of claim 12 wherein the individual correlation exponent is a D-value of the one of the microseismic events as estimated via a relationship between microseismic event-based counts and a dimension.

14. The system of claim 12 comprising processor-executable instructions stored in the memory to instruct the system to determine individual correlation exponents for a plurality of the microseismic events.

15. The system of claim 14 further comprising processor-executable instructions stored in the memory to instruct the system to filter the individual correlation exponents to generate a group of the microseismic events.

16. The system of claim 15 further comprising processor-executable instructions stored in the memory to instruct the system to associate at least a portion of the group with the fracture or another fracture generated or activated by the fracturing operation.

17. The system of claim 12 comprising processor-executable instructions stored in the memory to instruct the system to calculate correlation integral values with respect to a separation measure.

18. One or more non-transitory computer-readable storage media comprising computer-executable instructions to instruct a computer to:

monitor seismic emissions during a fracturing operation in a geologic environment via one or more sensors to generate microseismic data for microseismic events;

determine a plurality of b-value adjusted individual D-values for corresponding microseismic events associated with the fracturing operation based at least in part on adjustment of microseismic event-based counts of a correlation integral based at least in part on a b-value that relates a number of the microseismic events and microseismic event magnitude and based at least in part on estimation of a relationship between a dimension and microseismic event-based counts that comprise adjusted counts; and determine, based at least in part on a portion of the plurality of b-value adjusted individual D-values, a direction of growth of at least one fracture generated or activated by the fracturing operation.

19. The one or more non-transitory computer-readable storage media of claim 18 comprising computer-executable instructions to instruct a computer to implement a count adjusting equation that depends on b-value and event magnitude.

20. The one or more non-transitory computer-readable storage media of claim 18 comprising computer-executable instructions to instruct a computer to determine the direction of growth of at least one fracture generated or activated by the fracturing operation during the fracturing operation.

* * * * *